United States Patent [19]

Schafer

[11] Patent Number: 5,402,513
[45] Date of Patent: Mar. 28, 1995

[54] VIDEO WINDOW GENERATOR WITH SCALABLE VIDEO

[75] Inventor: John C. Schafer, Wylie, Tex.

[73] Assignee: Pixel Semiconductor, Inc., Plano, Tex.

[21] Appl. No.: 266,164

[22] Filed: Jun. 27, 1994

Related U.S. Application Data

[63] Continuation of Ser. No. 776,178, Oct. 15, 1991, abandoned.

[51] Int. Cl.⁶ .............................................. G06K 9/36
[52] U.S. Cl. ...................................... 382/47; 348/581; 348/596; 345/127
[58] Field of Search ............... 382/44, 47; 395/102, 395/139; 345/127, 131; 358/451; H04N 1/393; 348/581, 596

[56] References Cited

U.S. PATENT DOCUMENTS

| | | | |
|---|---|---|---|
| 4,212,910 | 7/1980 | Taylor et al. | 428/35 |
| 4,282,546 | 8/1981 | Reitmeier | 358/22 |
| 4,642,790 | 2/1987 | Minshull et al. | 364/900 |
| 4,663,615 | 5/1987 | Hernandez et al. | 340/721 |
| 4,774,581 | 9/1988 | Shiratsuchi | 358/180 |
| 4,792,856 | 12/1988 | Shiratsuchi | 358/180 |
| 4,855,813 | 8/1989 | Russell et al. | 358/22 |
| 4,862,154 | 8/1989 | Lopez | 340/747 |
| 4,866,520 | 9/1989 | Nomura et al. | 358/140 |
| 4,868,765 | 9/1989 | Diefendorff | 364/521 |
| 4,991,122 | 2/1991 | Sanders | 364/521 |
| 5,008,752 | 4/1991 | Van Nostrand | 358/160 |
| 5,022,085 | 6/1991 | Cok | 382/1 |
| 5,119,184 | 6/1992 | Hiratsuka et al. | 358/75 |
| 5,189,529 | 2/1993 | Ishiwata et al. | 358/451 |

Primary Examiner—Leo H. Boudreau
Assistant Examiner—Andrew W. Johns
Attorney, Agent, or Firm—Winstead Sechrest & Minick

[57] ABSTRACT

A pixel processor is disclosed which is comprised of a video window generator (VWG) (10). VWG (10) utilizes a conversion section for receiving an input video signal in a YUV 422 video format and converting it to an RGB video format. The conversion section includes a chroma interpolator 56 for converting the YUV 422 video format to a YUV 444 video format, a color converter (58) for converting the YUV 444 video format to an RGB video format, and then to a gamma coding removal block (60) for removing gamma coding. After conversion, the RGB video format signal is then scaled down by a linear resampler block (62) to average information over a predetermined portion of the input display space for output to a predetermined portion of the output display space. The scaled video output is truncated by a quantization processor (64) and then input to a FIFO (66). A control unit (68) controls the operation of the system. The linear resampler circuit (68) is an interpolation filter for averaging the information of a number of pixels disposed about a point in the input display space that is to be mapped into a point in the output display space. The point in the output display space is comprised of a pixel. The interpolation filer operates on pixels disposing in an adjacent relationship within a row of pixels within an input array. If the point to be mapped into the output display space falls between two pixels, the weighted average is taken between the two adjacent pixels. Rows of pixels are selected in accordance with the nearest neighbor algorithm. The quantization processor (64) is operable to truncate a predetermined number of bits from each word in each of the color planes in the output data prior to outputting the data. The truncated data is then utilized as an error which is added to the value of the next pixel before truncation thereof.

45 Claims, 13 Drawing Sheets

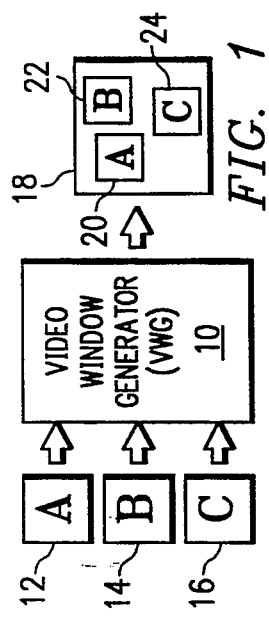
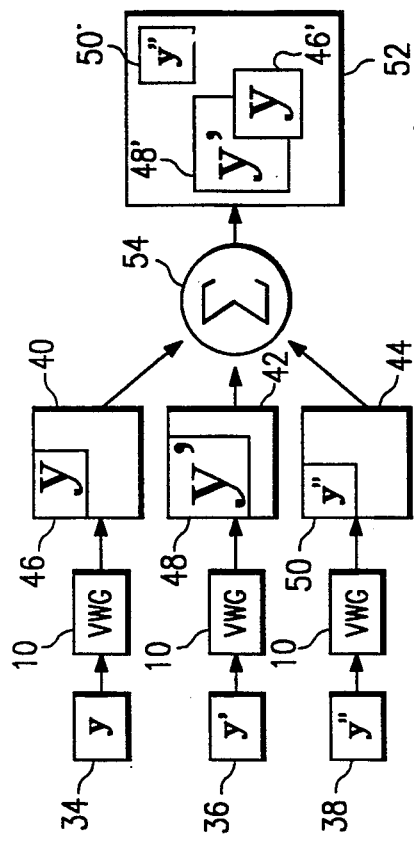
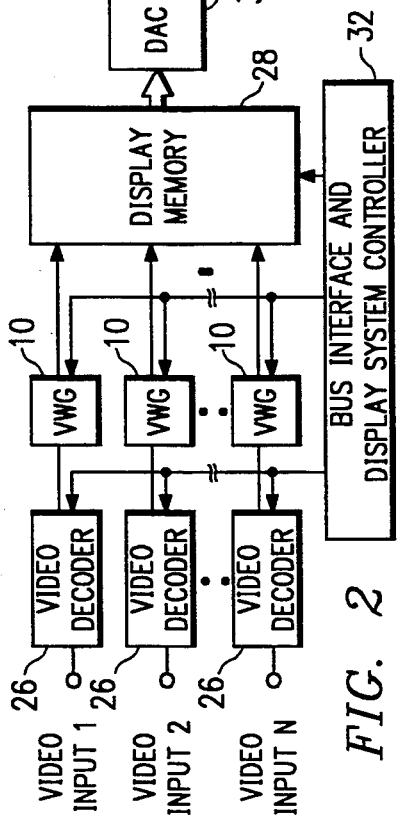
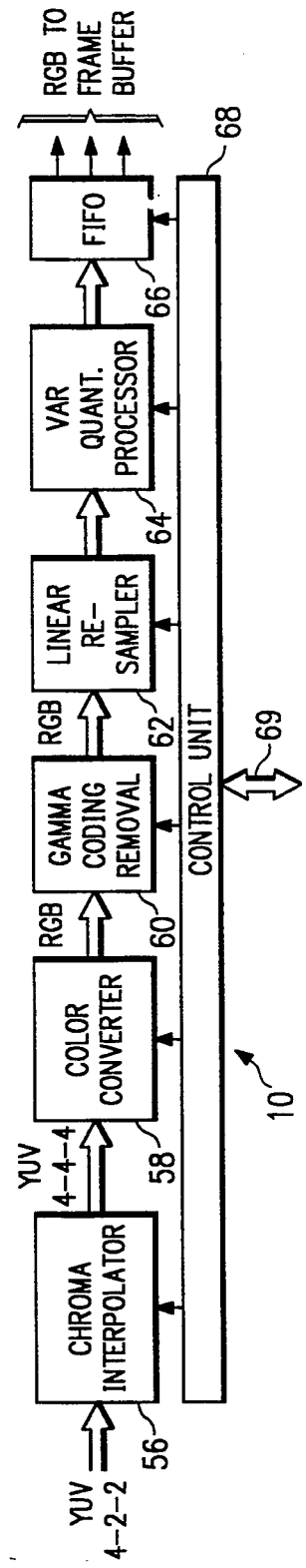

VIDEO WINDOW GENERATOR WITH SCALABLE VIDEO

This is a continuation of application Ser. No. 07/776,178, filed on Oct. 15, 1991, now abandoned.

TECHNICAL FIELD OF THE INVENTION

The present invention pertains in general to Pixel processors and, more particularly, to a Pixel processor for performing real-time interpolated video scaling operations.

BACKGROUND OF THE INVENTION

The advent of the personal computer has given rise to a large number of computer-related applications, all of these applications generally requiring output on some type of display. In the initial stages of the personal computer, the display was primarily utilized to display text. However, as computers became faster and memory became less expensive, the way in which information was presented to the users came to the forefront of technology. One problem that faced early personal computer users was the speed at which the display could be updated. This has progressed from a mode wherein each update of the display appeared as if it was "painted" across the display screen, to the present situation wherein the display can be updated in a real-time manner with respect to motion from one frame to the next. This enables a digital video signal to be output on the display screen and, for each vertical scan of the display, to depict real-time motion.

Another environment that has arisen through use of the personal computer is the advent of "window" environments. In these type of environments, multiple applications are pulled up on a computer display within windows, these windows overlying one another. The object is to run a program in different windows on a single display simultaneously. Present computer systems can handle multi-tasking operations wherein different programs can be simultaneously processed, but a different problem exists when trying to update the various windows with this process information. This situation is further exacerbated when the window environment allows "scaling" of the windows, such that the contents of a full size window, i.e., a window taking up the entire display space, is scaled down to a significantly smaller window with all of the information contained within that window.

The above windowing problems are further increased when trying to display real-time video in a windowing environment. Real-time video is typically generated in a predetermined "display space" wherein all of the information is divided up into picture elements or "pixels." Each of these pixels defines the limit of the resolution of any display space. In order to scale down a given display space to a window within an output display space, it is necessary to reduce the overall number of pixels that represent a given input display space. For example, a pixel area of 20×40 may need to be reduced to a single pixel. This will reduce the image quality, etc. that the user perceives. Although some systems at present do allow for scaling of real-time video, these systems tend to have poor image quality and, therefore, there exists a need for an improved system having a more versatile video scaling operation while retaining a relatively high image quality and image resolution.

SUMMARY OF THE INVENTION

The present invention disclosed and claimed herein comprises a video scaling apparatus used in a pixel processor. The video scaling apparatus includes an input for receiving scaling information and an input for receiving input video information from the input display space. An output is provided for outputting scaled video information to the output display space in substantially real time. An averaging circuit is operable to average video information in a predetermined area of the input display space in accordance with the predetermined averaging algorithm and output the averaged video information in a predetermined area of the output display space. The ratio of the predetermined area of the input display space to the predetermined area of the output display space is determined by the scaling information received on the scaling input.

In further aspect of the present invention, a control circuit is operable to receive location parameters for determining the location of the predetermined area of the input display space that is to be scaled down for output to the output display space. The input display space is substantially the same size as the output display space wherein each of the input and output display spaces are updated in frames. A frame buffering device is provided for allowing the averaged video information to be output at a different frame rate than the frame rate of the video information in the input display space.

In a yet further aspect of the present invention, the averaging circuit comprises an interpolation filter that is operable to generate the weighted average of at least two pixels disposed proximate to the point in the input display space that is to be mapped to a point in the output display space. This mapping is done in accordance with the scaling information such that the point in the output display space comprises a pixel in the output display space. This pixel in the output display space has a value equal to the weighted averaged generated by the interpolation filter.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a diagrammatic view of the video operation of a video window generator;

FIG. 2 illustrates a more detailed block diagram of the system of FIG. 1;

FIG. 3 illustrates a diagrammatic view of the block diagram of FIG. 2;

FIG. 4 illustrates a detailed block diagram of the VWG;

DETAILED DESCRIPTION OF THE INVENTION

Figure 5:
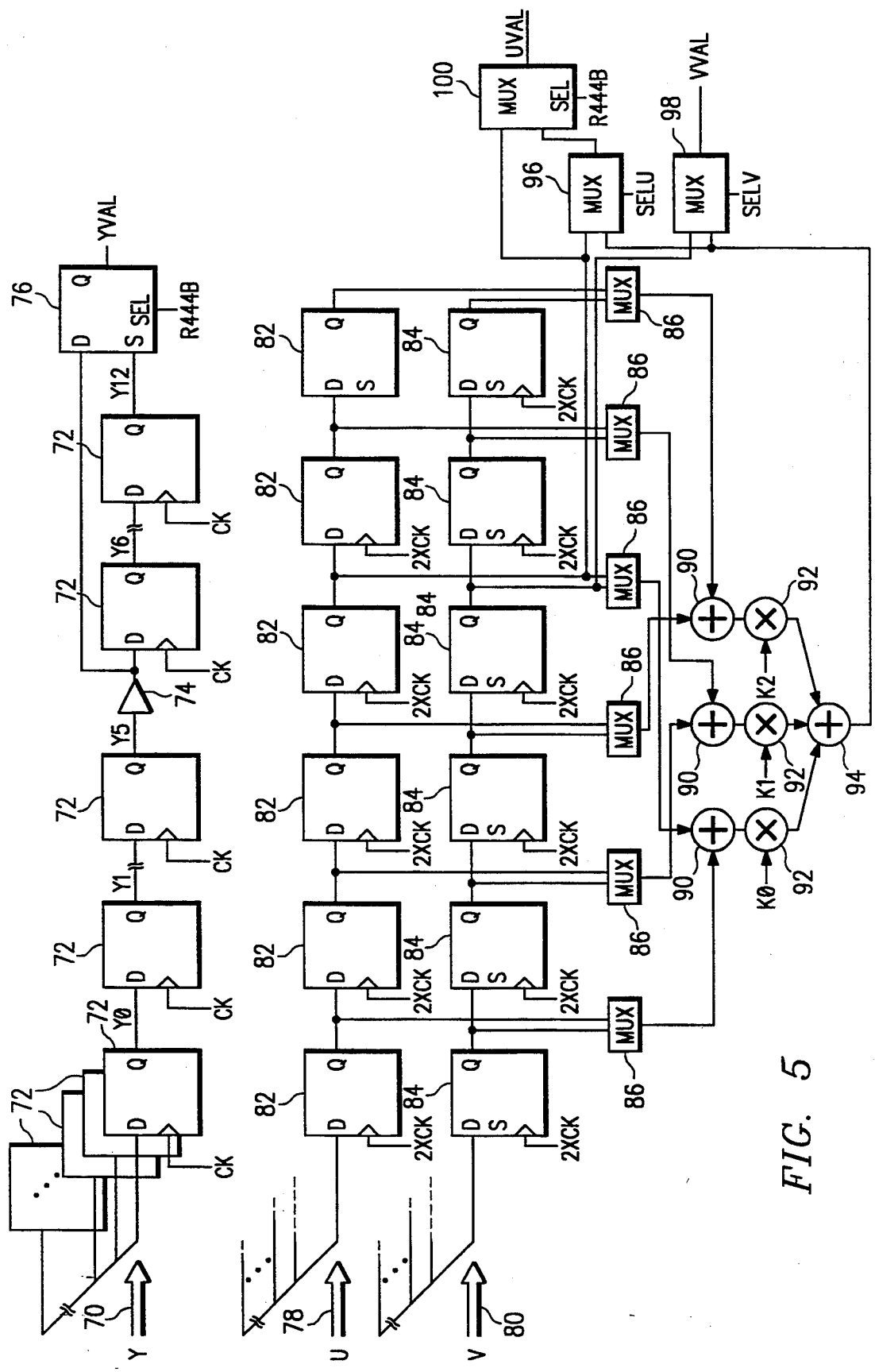
FIG. 5 illustrates a detailed logic diagram for the chroma interpolator 56.

Referring now to FIG. 1, illustrates a diagrammatic view of the video operation of a video window generator 10 (VWG) in accordance with the present invention. The VWG 10 is operable to receive one of a plurality of inputs, each comprising a video signal. Each of the video signals is received, processed and output. The video inputs are represented by input display spaces 12, 14 and 16, and an output display space 18 is represented on the output. Although illustrated as receiving multiple video inputs, each comprising one of the display spaces 12–16, it should be understood that in the preferred embodiment, a separate VWG 10 is provided for each of the video inputs. As will be further described hereinbelow, the VWG 10 is operable to receive the video input, process the information in the associated input display space, scale this information down or up and output the scaled information to a frame buffer for operation thereon.

The input display space 12 is illustrated as having the letter "A" depicted within its display space, the input display space 14 is illustrated as having the letter "B" depicted in its display space and the input display space 16 is illustrated as having the letter "C" depicted in its display space. Each of the input display spaces 12–16 is comprised of a plurality of pixels, a typical array display space having 640 pixels along the horizontal and 480 pixels along the vertical. However, some display spaces have a higher number of pixels in the display space, depending upon the resolution required. Each pixel defines a brightness level and a color level, wherein groups of pixels taken together define the actual image in the display space. The VWG 10 is operable to take each video input and convert its pixel information into a separate pixel map on the output thereof, which output pixel map can then be assembled into the output display space 18.

In the output display space 18 of FIG. 1, it can be seen that there are three "windows", 20, 22 and 24 The window 20 occupies a predetermined number of pixels in an array, as does the window 22 and the window 24. The information in display space 12 is scaled down and then inserted into the display space 18 as window 20. Similarly, the information in display space 14 is scaled down to form window 22 and the information in display space 16 is scaled down to form the information in window 24. If, for example, each of the display spaces 12–16 were arranged with a display space of 640×480 pixels and the output display space was similarly arranged, the windows 20–24 would comprise a smaller number of pixels than the original information in display spaces 12–16. The VWG 10 of the present invention is operable to perform this scaling operation. Further, the video information in display spaces 12–16 operates virtually in a real-time mode such that for each frame change of information in the input display results in a frame change of information in the output display space 18. Therefore, the VWG 10 is operable to perform the scaling operation in a "real-time mode".

Referring now to FIG. 2, illustrates a more detailed block diagram of the system of FIG. 1, illustrating how the VWG 10 is implemented in the preferred embodiment. A plurality of VWGs 10 are provided, each for receiving a single video input and outputting a single video output. The video inputs range from "1" to "N" each of which is input to a video decoder 26, which is a conventional device of the type that is manufactured by Phillips Corporation under part No. SAA 7191. This circuit is operable to receive a standard video input and convert it into a $YC_bC_r$ 422 format, which is the standard video format defined in the CCIR 601 video standards. Hereinafter, the $YC_bC_r$ format will be referred to as a "YUV" format where "U" is equivalent to $C_b$ and "V" is equivalent to $C_r$. The $YC_bC_r$ 422 formatted video is then input to the VWG 10, the VWG 10 operable to process and output a scaled down version of the input display space that was received at the input of the video decoder 26, or a scaled down portion thereof. The VWG 10 can either scale down the entire input display space to a predefined window in the output display space, or it can scale down a portion of the input display space into a predetermined window size in the output display size. However, it should be understood that the VWG 10 can also scale up a portion of the information in the input display space.

The information output by the VWG 10 is disposed in a First In-First Out (FIFO) buffer (not shown), the output of which is then input to a frame buffer or display memory 28. The frame buffer portion of the display memory 28 comprises a pixel map of the actual output display space that is interfaced therewith. The display memory 28 is operable to contain one frame of information which is then input to a digital-to-analog converter (DAC) 30 to output analog RGB information to a conventional monitor. The system operates in real time such that each new frame of video information is retrieved from the FIFO outputs of each of the VWGs 10. A bus interface and display system controller 32 is provided that controls the size of the video windows and the placement thereof in the frame buffer or display memory 28. The VWGs 10 do not define in the display space of the memory 28 the location of the window into which the scaled down information or scaled up information is inserted. Rather, this merely provides the scaled down video information in a format that can be input to the display memory 28.

Referring now to FIG. 3, illustrates a diagrammatic view of the block diagram of FIG. 2. Three VWGs 10 are illustrated that are operable to process display spaces 34, 36 and 38, respectively. The display space 34 has the letter "Y" depicted therein, a display space 36 has the letter "Y" depicted therein and the display space 38 has the letter "Y" depicted therein. The VWGs 10 are operable to convert the display spaces 34–38 into three output display spaces 40, 42 and 44, respectively. The output display spaces 40–44 represent the actual limits of the output, i.e., if the input display space is 640×480, the maximum size that can be accommodated on the output is a display space of 640×480. The scale down operation results in shrinking of the associated output display space such that the input display space 34 is reduced to a window 46 in output display space 40, the input display space 36 is reduced to a window 48 in output display space 42 and the input display space 38 is reduced to a window 50 in output display space 44.

The output display spaces 40–44 are all identical and correspond to a resultant output display space 52. An assembler 54 is provided that receives the information of windows 46–60 and positions them within the resultant output display space 52. It can be seen that the windows 46–60 are converted to windows 46', 48' and 50'. As will be described hereinbelow, the assembler circuit 54 is operable to determine at each scan line in the horizontal direction which pixel is to be disposed thereat. For example, when the upper left hand corner of the window 48' is reached, pixel information is retrieved from the output display space 42. This continues until a position is reached that corresponds to the upper right hand corner of window 48'. Thereafter, pixel information is retrieved from other sources for inserting into the resultant output display space 52. The VWGs 10 merely provide the information at the output thereof for access by the assembler 54 during a given frame. On the next frame, new information is provided by the VWGs 10. This allows for real-time motion to be assembled by the assembler 54 and inserted within the appropriate window within the resultant output display space 52. Therefore, the VWGs 10 in the preferred embodiment do not provide positioning information, although they could be designed to do such.

Referring now to FIG. 4, illustrates a detailed block diagram of the VWG 10. The input to the VWG 10 is a YUV coded 422 video decoded signal that is input to a chroma interpolator 56. The chroma interpolator is operable to convert the YUV 422 format to a YUV 444 format. In accordance with the YUV 422 format, instead of four elements of color being associated with each four pixels, there are only two elements of chrominance. Each pixel contains all of the Y-brightness elements, whereas the U- and the V-chrominance elements are only present for every other pixel. As such, the chroma interpolator 56 fills in the missing U- and V-chrominance elements to comprise the YUV 444 format on the output of the chroma interpolator 56.

The output of chroma interpolator 56 is then input to a color converter 58. Color converter 58 is operable to convert from the YUV 444 format to an RGB format. The RGB format is then input to a gamma coding removal circuit 60. This circuit is operable to compensate for gamma encoding of the video signal on the input to the system. Basically, broadcast video is generally encoded with the gamma information that is removed before further processing of the signal. This allows processing of the original data that was generated prior to broadcasting and results in a clean RGB signal output from the gamma coding removal circuit 60.

The chroma interpolator 56, color converter 58 and gamma removal circuit 60 are conventional circuits which can be found in conventional parts, such as the Phillips 7192, referred to above. However, the typical input to the circuit with YUV 422 video would be a 16-bit input. As will be described hereinbelow, the present system provides for the receipt of RGB on a 24-bit input and also a YUV 444 formatted video signal, also on a 24-bit input. In this mode, the chroma interpolator 56 is bypassed when the YUV 444 formatted signal is received and both the chroma interpolator 56 and the color converter 58 are bypassed when the RGB signal is received. This will be described in more detail hereinbelow.

The output of the gamma coding removal circuit is then input to a linear resampler circuit 62. The linear resampler circuit 62 is operable to process the pixel information in the input display space in accordance with predetermined algorithms to scale the input display space, which comprises a full frame of information, to a smaller area of that full frame. The output of the linear resampler circuit 62 is input to a variable quantization processor 64. The processor 64 is operable to reduce the amount of information with respect to color. For example, output of the gamma removal circuit is 24 bits, eight bits each of red, green, and blue color components. The variable quantization processor 64 is operable to convert this down to an 8 bit RGB format, which is 3 bits of red, 3 bits of green and 2 bits of blue. Although this results in the loss of color information, this is averaged out by a predetermined algorithm. By reducing the amount of information that is processed, the system can more easily facilitate a real-time mode and reduce display memory requirements. This essentially is a truncation of information, whereas the color information per pixel is now reduced to eight bits per pixel. As will be described hereinbelow, the 24 bits of information that has been truncated is not just discarded, but rather, this truncated information is utilized to provide a "contouring" effect, as will be described in more detail hereinbelow.

The output of the processor 64 is input to a FIFO 66 which is operable to contain a predetermined amount of information, this amount of information representing only the information that must be retained in order to process the output thereof for insertion into the output display space during a given frame. A control unit 68 is provided for controlling the operation of the VWG 10.

Referring now to FIG. 5, illustrates a detailed logic diagram for the chroma interpolator 56. As described above, the chroma interpolator 56 converts from a YUV 422 format to a YUV 444 format. The YUV 422 format is organized as illustrated in Table 1.

TABLE 1

| $Y_{-4}$ | $Y_{-3}$ | $Y_{-2}$ | $Y_{-1}$ | $Y_0$ | $Y_{+1}$ | $Y_{+2}$ | $Y_{+3}$ |
|---|---|---|---|---|---|---|---|
| — | $U_{-3}$ | — | $U_{-1}$ | — | $U_{+1}$ | — | $U_{+3}$ |
| — | $V_{-3}$ | — | $V_{-1}$ | — | $V_{+1}$ | — | $V_{+3}$ |

It can be seen that the U- and the V-values are present only for every other Y-value, whereas a separate Y-value is provided for each pixel. The chroma interpolator is operable to fill-in the U- and V-values to provide an additional eight bits of information over the YUV 422 format. The Y-values consist of eight bits which are input on a bus 70 and each bit is then input to a series of D-type flip flops 72. There are thirteen D-type flip flops with the Q-output of the sixth flip flop 72 input to a buffer 74, the output of which is input to the D-input of the seventh flip flop. The output of the first flip flop is designated Y0 and the output of the last flip flop is designated Y12. The output of the buffer 74 constitutes the buffered Y5 output. A multipleureal flip flop 76 is provided for receiving on two inputs the output of the buffer 74 and the output of the Y12 flip flop 72. A scan input R444B is provided on the select input of the multiplexed flip flop 76 to select either the output of the buffer 74 or the output of the Y12 flip flop 72. As described above, the input could be preformatted in the YUV 444 format and, as such, it is not necessary to process the Y-value through the thirteen flip flops 72. Rather, the value can be output at an earlier stage, the output of the Y5 flip flop.

The U-value and the V-value both comprise 8-bit words, and are input on data buses 78 and 80, respectively. The bus 78 has each bit thereof connected to a series connected group of D-flip flops 82, there being eight banks thereof. Each bit of the bus 80 is input to a series connected bank of flip flops 84, there being eight banks of flip flops 84. In each of the banks of flip flops 82 and the banks of flip flops 84, there are five D-type flip flops connected in a series configuration with the Q-output of the previous flip flop connected to the D-input of the next one in the series. The clock input is connected to a 2× clock that operates at twice the speed of the clock input to the flip flops 72. Therefore, the U-values and the V-values are clocked through at twice the rate of the data clock through the flip flops 72.

The output of each of the flip flops 82 and each of the flip flops 84 are input to respective and associated multiplexers 86, there being a multiplexer 86 associated with each set of flip flops 82 and 84, such that the first flip flop 82 and the first flip flop 84 at both of the banks are input to one multiplexer 86, etc. This results in six multiplexers 86. In operation, the U-value occurs for every other Y-value, such that only odd U-values are selected. Therefore, one would select the $U_{+1}$, the $U_{+3}$, the $U_{+5}$, the $U_{-1}$ and the $U_{-3}$ values for the corresponding Y-value. These are then selected by the multiplexers 86 for operation thereon.

The particular algorithm utilized in the chroma interpolator is performed by a group of adders and multipliers, the operation being multiplexed such that for one cycle, the corrected U-values are determined, and for one cycle, the corrected V-values are selected. The output of the multiplexers 86 are input to one of three adders 90, with the first three multiplexers 86 input to the A-input of the adders 90 and the output of the second three multiplexers input to the B-input of the three adders 90. The output of each of the adders 90 are respective inputs of three multipliers 92, which are operable to multiply the output of the adders 90 by a constant $K_0$, $K_1$ and $K_2$, respectively. $K_0$ is set to value of "2", $K_1$ is set to a value of "−14" and $K_2$ is set to a value of "76". The outputs of multipliers 92 are added in a three-way adder 94, the output of which constitutes a new U- or V-value to be inserted into the newly formatted output, the adder 94 also operating to round the 8-bit value such that results less than zero are set to zero and results more than "255" are set to "255." In general, this circuit performs a low pass filter function which is as follows:

$$1 + \frac{76}{128} \times (z^{-1} + z^1) -$$  (1)

$$\frac{14}{128} \times (z^{-3} + z^3) + \frac{2}{128} \times (z^{-5} + z^5)$$

The output of the adder circuit 94 is input to one input of a multiplexer 96, and one input of a multiplexer 98. Multiplexer 98 also receives an input from the output of a fourth D-type flip flop 84 and the other input of the multiplexer 96 is connected to the output of the fourth D-type flip flop 82. The output of multiplexer 98 provides the V-value and the output of multiplexer 96 is connected to one input of a multiplexer 100, which provides on the output thereof the U-value. The other input of multiplexer 100 is connected to the output of the fourth D-type flip flop 84. Multiplexer 100 is operable to be controlled to select either the output of multiplexer 96 for a YUV 422 format or the output of the fourth flip flop 84 for a YUV 444 format. Multiplexers 96 and 98 are also connected to select the outputs of the fourth D-type flip flops 82 and 84, respectively, for a YUV 444 format, such that the circuitry for performing the filter response on the YUV 422 formatted video input is bypassed.

Figure 6:
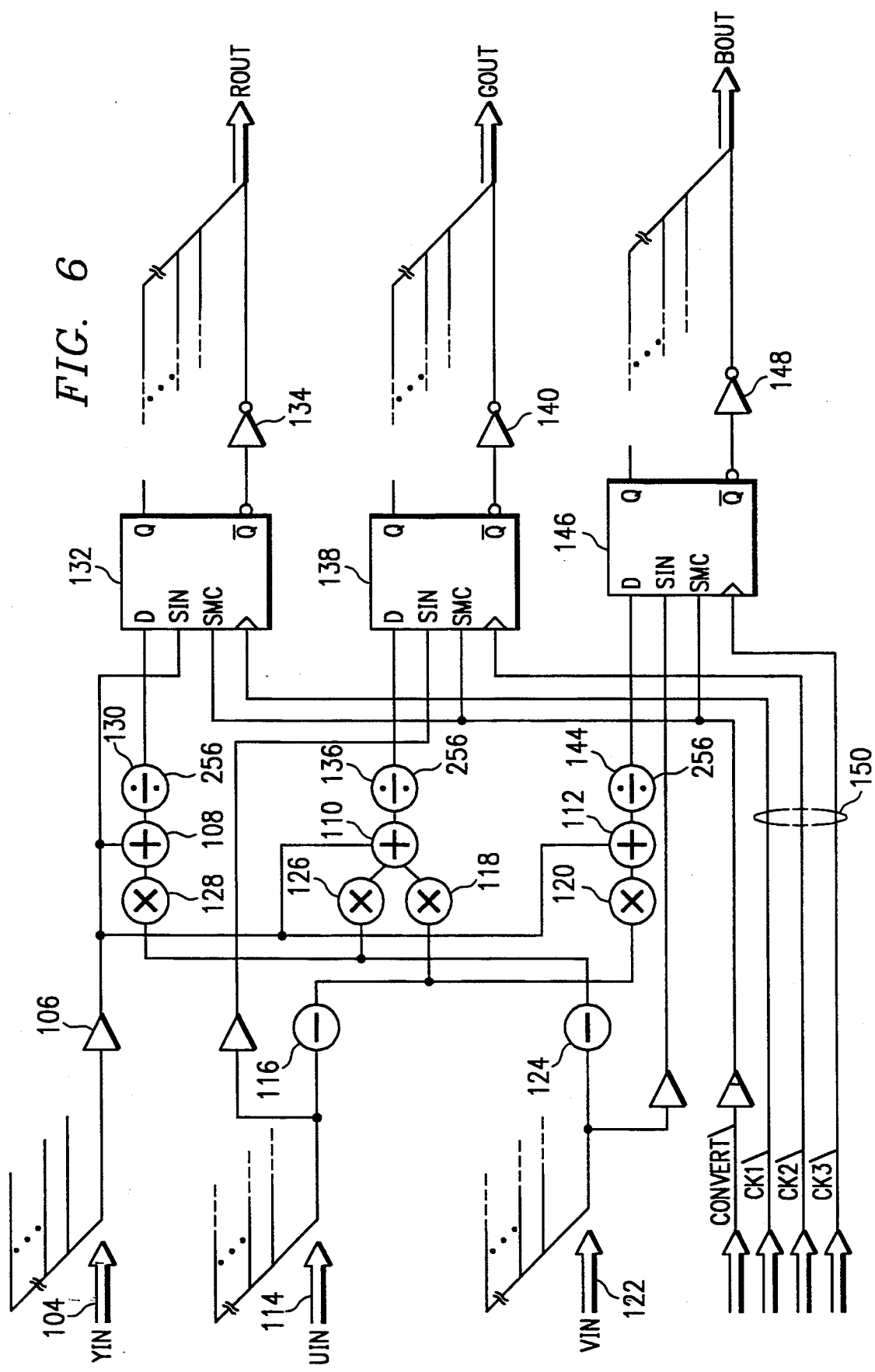
FIG. 6 illustrates a logic diagram for the color converter 58 of FIG. 4.

Referring now to FIG. 6, illustrates a logic diagram for the color converter 58 of FIG. 4. The color converter, as described above, is operable to convert the YUV 444 format into an RGB format or, alternatively, to merely pass RGB through in the bypass mode. The input consists of a 24-bit input, eight bits for Y, eight bits for U and eight bits for V, and the output is comprised of three eight-bit outputs, eight bits for R, eight bits for G and eight bits for B. The color converter is operable to utilize the Y, U and V components in the YUV 444 format to calculate the R, G and B constituents in accordance with the following equation:

$$R = Y + \frac{351}{256} \times (V - 128)$$  (2)

$$G = Y - \frac{179}{256} \times (V - 128) - \frac{86}{256} \times (U - 128)$$  (3)

$$B = Y + \frac{443}{256} \times (U - 128)$$  (4)

The Y-input is input on a bus 104 to a bank of buffers 106, only one-bit of the Y, U and V illustrated. The output of the buffer comprises the Y-value, which is input to three summation circuits 108, 110 and 112, corresponding to the R, G and B outputs, respectively, each of which circuits 108–112 is operable to first provide a shift operation to essentially multiply the eight-bit Y-value by a factor of 256 and then perform a summing operation. The U-value is input to a bus 114 and then to a subtraction circuit 116 to subtract the value of 128 therefrom. The U-value is then input to one input of a multiplication circuit 118 and one input of a multiplication circuit 120, multiplication circuit 118 associated with the G-value and multiplication circuit 120 associated with the B-value. The B-value is input on the bus 122, the output of which is input to a subtraction circuit 124 to subtract the value of 128 therefrom. The output of subtraction circuit 124 is input to one input of a multiplication circuit 126 and one input of the multiplication circuit 128, multiplication circuit 126 associated with the G-value and multiplication circuit 128 associated with the R-value.

The multiplication circuit 128 is operable to multiply the value "V-128" with the value 351 and then output this to the other input of the summation circuit 108 to thereby add the value of Y*256 thereto. This value is then output to a division circuit 130 that is operable to divide the entire output of the summation circuit 108 by a value of 256. This will provide the result in Equation 2, this being input to the D-input of a D-flip flop/multiplexer 132. The other multiplexer input is connected directly to the output of the buffer 106, this comprising the R-value when it is determined that an RGB input is present. This allows the RGB input to be passed directly through without utilizing the arithmetic circuits. The input SMC is the select input which determines whether a conversion is necessary. A clock input is operable to clock the flip flop/multiplexer 132. The Q-bar output then provides the R-value on the output of an inverter 134.

The multiplication circuit 126 is operable to multiply the value "V-128" by a factor of −179 and a multiplication circuit 118 is operable to multiply the value of "U-128" by a factor of −86, both of these values then summed with the value Y*256 in summing circuit 110. The output of summing circuit 110 is then input to a division circuit 132 to divide this value by a factor of 256, which division circuit 136 is also operable to provide saturation. The output of division circuit 136 is input to the D-input of a D-flip flop/multiplexer 138, which is similar to flip flop/multiplexer 132. The Q-bar output of flip flop/multiplexer 138 provides the G-value through an inverter 140.

The multiplication circuit 120 is operable to multiply the value "U-128" by a factor of 443, the output of the multiplication circuit 120 then input to the summation circuit 112 to be summed with the value Y*256. The output of the summation circuit 112 is input to a division circuit 144 to divide the output of the addition circuit 112 by a factor of 256. This is then input to the D-flip flop/multiplexer 146, the Q-bar output providing the B-value through an inverter 148. The flip flop/multiplexers 132, 138 and 146 are clocked by clock signals on lines 150.

Figure 7:
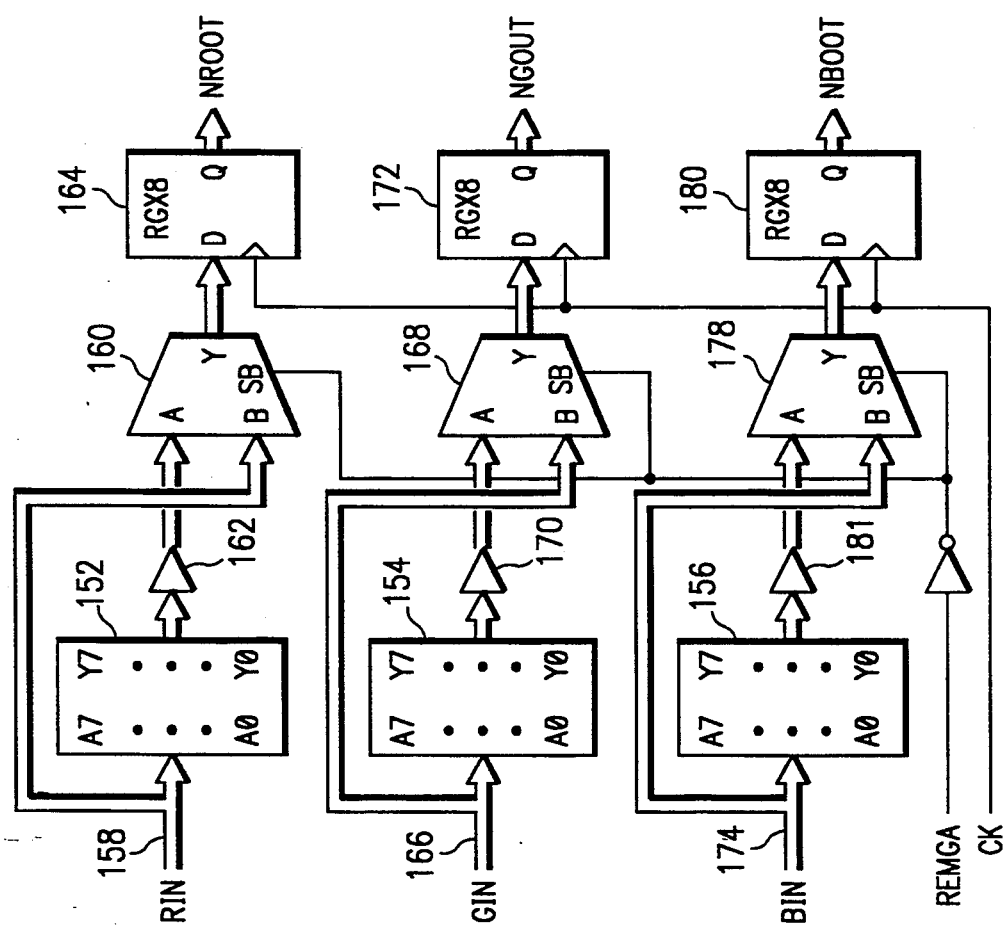
FIG. 7 illustrates a logic block diagram of the gamma coding removal circuit 60.

Referring now to FIG. 7, illustrates a logic block diagram of the gamma coding removal circuit 60. As, described above, this circuit accepts an RGB input and removes the gamma coding that is normally present in a YUV television signal. Three circuits are provided, one for each color channel, the output of each circuit basically having its input raised to the 2.2 power (with values interpreted as fractions ranging from 0–255/256). The transfer function is a standard transfer function and is realized with a ROM look-up table, as illustrated in Table 2.

TABLE 2

| IN | OUT | IN | OUT | IN | OUT | IN | OUT | IN | OUT | IN | OUT | IN | OUT |
|---|---|---|---|---|---|---|---|---|---|---|---|---|---|
| 0 | 0 | 39 | 4 | 78 | 19 | 117 | 46 | 156 | 86 | 195 | 141 | 234 | 210 |
| 1 | 0 | 40 | 4 | 79 | 19 | 118 | 47 | 157 | 87 | 196 | 142 | 235 | 212 |
| 2 | 0 | 41 | 5 | 80 | 20 | 119 | 47 | 158 | 89 | 197 | 144 | 236 | 214 |
| 3 | 0 | 42 | 5 | 81 | 20 | 120 | 48 | 159 | 90 | 196 | 145 | 237 | 216 |
| 4 | 0 | 43 | 5 | 82 | 21 | 121 | 49 | 160 | 91 | 199 | 147 | 238 | 218 |
| 5 | 0 | 44 | 5 | 83 | 21 | 122 | 50 | 161 | 92 | 200 | 149 | 239 | 220 |
| 6 | 0 | 45 | 6 | 84 | 22 | 123 | 51 | 162 | 94 | 201 | 150 | 240 | 222 |
| 7 | 0 | 46 | 6 | 85 | 23 | 124 | 52 | 163 | 95 | 202 | 152 | 241 | 224 |
| 8 | 0 | 47 | 6 | 86 | 23 | 125 | 53 | 164 | 96 | 203 | 154 | 242 | 226 |
| 9 | 0 | 48 | 6 | 87 | 24 | 126 | 54 | 165 | 97 | 204 | 155 | 243 | 228 |
| 10 | 0 | 49 | 7 | 88 | 24 | 127 | 55 | 166 | 99 | 205 | 157 | 244 | 230 |
| 11 | 0 | so | 7 | 89 | 25 | 128 | 56 | 167 | 100 | 206 | 159 | 245 | 232 |
| 12 | 0 | 51 | 7 | 90 | 26 | 129 | 57 | 168 | 101 | 207 | 160 | 246 | 235 |
| 13 | 0 | 52 | 8 | 91 | 26 | 130 | 58 | 169 | 103 | 208 | 162 | 247 | 237 |
| 14 | 0 | 53 | 8 | 92 | 27 | 131 | 59 | 170 | 104 | 209 | 164 | 248 | 239 |
| 15 | 0 | 54 | 8 | 93 | 28 | 132 | 60 | 171 | 105 | 210 | 166 | 249 | 241 |
| 16 | 1 | 55 | 9 | 94 | 28 | 133 | 61 | 172 | 107 | 211 | 167 | 250 | 243 |
| 17 | 1 | 56 | 9 | 95 | 29 | 134 | 62 | 173 | 108 | 212 | 169 | 251 | 245 |
| 18 | 1 | 57 | 9 | 96 | 30 | 135 | 63 | 174 | 109 | 213 | 171 | 252 | 247 |
| 19 | 1 | 58 | 10 | 97 | 30 | 136 | 64 | 175 | 111 | 214 | 173 | 253 | 249 |
| 20 | 1 | 59 | 10 | 98 | 31 | 137 | 65 | 176 | 112 | 215 | 174 | 254 | 252 |
| 21 | 1 | 60 | 11 | 99 | 32 | 138 | 66 | 177 | 114 | 216 | 176 | 255 | 254 |
| 22 | 1 | 61 | 11 | 100 | 32 | 139 | 67 | 178 | 115 | 217 | 178 | | |
| 23 | 1 | 62 | 11 | 101 | 33 | 140 | 68 | 179 | 117 | 218 | 180 | | |
| 24 | 1 | 63 | 12 | 102 | 34 | 141 | 69 | 180 | 118 | 219 | 182 | | |
| 25 | 2 | 64 | 12 | 103 | 35 | 142 | 70 | 181 | 119 | 220 | 183 | | |
| 26 | 2 | 65 | 13 | 104 | 35 | 143 | 71 | 182 | 121 | 221 | 185 | | |
| 27 | 2 | 66 | 13 | 105 | 36 | 144 | 72 | 183 | 122 | 222 | 187 | | |
| 28 | 2 | 67 | 13 | 106 | 37 | 145 | 73 | 184 | 124 | 223 | 189 | | |
| 29 | 2 | 68 | 14 | 107 | 38 | 146 | 74 | 185 | 125 | 224 | 191 | | |
| 30 | 2 | 69 | 14 | 108 | 38 | 147 | 76 | 186 | 127 | 225 | 193 | | |
| 31 | 2 | 70 | 15 | 109 | 39 | 148 | 77 | 187 | 128 | 226 | 195 | | |
| 32 | 3 | 71 | 15 | 110 | 40 | 149 | 78 | 188 | 130 | 227 | 197 | | |
| 33 | 3 | 72 | 16 | 111 | 41 | 150 | 79 | 189 | 131 | 228 | 198 | | |
| 34 | 3 | 73 | 16 | 112 | 42 | 151 | 80 | 190 | 133 | 229 | 200 | | |
| 35 | 3 | 74 | 17 | 113 | 42 | 152 | 81 | 191 | 134 | 230 | 202 | | |
| 36 | 3 | 75 | 17 | 114 | 43 | 153 | 82 | 192 | 136 | 231 | 204 | | |
| 37 | 4 | 76 | 18 | 115 | 44 | 154 | 84 | 193 | 139 | 232 | 206 | | |
| 38 | 4 | 77 | 18 | 116 | 45 | 155 | 85 | 194 | 139 | 233 | 208 | | |

This primarily makes the conversion. Therefore, the value that is input to the address input results in the output value being output from the particular ROM. FIG. 7 illustrates three ROMs, 152, 154 and 156. The address input of ROM 152 is connected to an R-input bus 158 that is connected to the address input of the ROM 152 and also to the D-input of an eight-bit wide multiplexer 160. The output of the ROM 152 on the data output thereof is input through an eight-bit wide buffer 162, to the A-input of the multiplexer 160. The output of multiplexer 160 is input to the D-input of an eight-bit wide D-flip flop 164, the output of which provides the R-output with the gamma coding removed therefrom. The D-input of the multiplexer 160 allows bypassing of the gamma coding removal circuitry in the event that gamma coding removal is not necessary.

In a similar manner, a G-input bus 166 is connected to both the B-input of an eight-bit wide multiplexer 168 and also the address input of the ROM 154. The data output of ROM 154 is connected through an eight-bit wide buffer 170 to the A-input of the multiplexer 168. The output of multiplexer 168 is input through the D-input of an eight-bit wide D-flip flop 172, the output of which provides the G-output with gamma coding removed therefrom. A B-input bus 174 is connected to the B-input of an eight-bit wide multiplexer 178 and also to the address input of the ROM 156. The data output of the ROM 156 is connected through an eight-bit wide buffer 180 to the A-input of the multiplexer 178. The output of the multiplexer 178 is input to the D-input of an eight-bit wide D-flip flop 180, the output of which provides the G- or the B-output value on an eight-bit wide bus. Each of the flip flops 164, 174 and 180 are clocked by a clock input and the select input of the multiplexers 160, 168 and 178 are connected to a select input RENGAM.

Although illustrated as ROMs, the ROMs 152, 154 and 156 are actually implemented as a logic array. A tool called Synopsis was utilized to perform a logic synthesis wherein the table of values in Table 2 was provided and then the logic synthesis tool generated the logic function. This logic function was then implemented with combinatorial logic in a relatively straightforward manner. However, it should be understood that a ROM look-up table could have been utilized. Additionally, it should be understood that a RAM could be utilized such that the user could program the table illustrated in Table 2.

After the gamma coding has been removed, a clean RGB signal is then provided. As described above, the signal is then input to the linear resampler 62 where scaling and window clipping is performed by a 2×1 interpolation filter. The controls for this system are provided by software which the user generates, these controls utilized to store operating parameters in control registers in the control section. The general purpose of the linear resampler 62 is to map the source video to a destination video window. In the input RGB display space, the video signal is input to the linear resampler 62, the user defines a stop point and a start point for the horizontal and also along the vertical, and also a shrink is defined for each dimension. The shrink is equal to 1/"scale" value. For example, if a scale factor of two were desired, this would result in a shrink of $\frac{1}{2}$ or 50%. For even scale factors such as two, four, eight, etc., it is a relatively easy matter to accomplish in that for a scale factor of two every other pixel is selected from the stop point and for Q scale factor of four every fourth pixel is selected, etc. When a scale of other than an even factor is needed, it is necessary to interpolate the actual value. This represents the preferred embodiment. However, as will be described hereinbelow, the filter operation can be expanded from a 2-tap filter to a multi-tap filter, such that each output pixel value is averaged over a number of adjacent input pixels.

Figure 8:
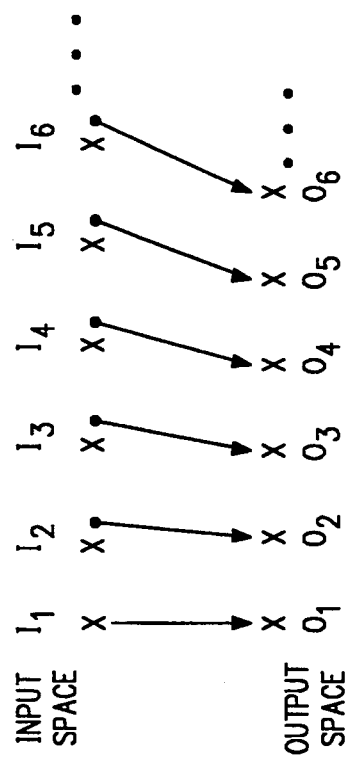
FIG. 8 illustrates a diagrammatic view of the input space pixels mapped into the output space in a diagrammatic view.

Referring to FIG. 8, illustrates a diagrammatic view of the input space pixels mapped into the output space in a diagrammatic view. Each of the pixels in the input space is represented by an "X" and labelled $I_1$, $I_2$, $I_3$, etc., each "X" representing 24 bits of RGB information. Of course, in the input space, each pixel is disposed adjacent the next pixel in a given scan line, the input space representing only a given scan line. The output space also represents a plurality of pixels represented by "X's" and labelled $O_1$, $O_2$, $O_3$, etc. The $I_1$ input pixel represents the start pixel with the stop pixel not illustrated. Therefore, the $I_1$ pixel and the information associated therewith will map directly into the $O_1$ pixel for the 2-tap filter in the preferred embodiment. However, if the information is scaled down, the information mapped from the input space to the output space for $O_2$ would be somewhere between $I_2$ and $I_3$, depending upon the scale factor. For example, if the scale factor were 8/9, this would result in a shrink of $1\frac{1}{8}$, such that for each step from pixel $O_n$ to $O_{n+1}$ results in a step of $1\frac{1}{8}$ across the input space. At output pixel $O_8$, the information in pixel $I_9$ would be directly mapped thereto for the 2-tap filter in the preferred embodiment.

In accordance with the present invention, for each step that falls between two pixels, the pixel output value would be equal to the weighted average between the two pixels at which a given step would occur. For example, with the above shrink of $1\frac{1}{8}$, the weighted average between $I_5$ and $I_6$ would essentially consist of the midpoint therebetween. Therefore, total value would be approximately half of the value of $I_5$ summed with half of the value of $I_6$. However, for the information mapped into $O_2$, this would be the weighted average between $I_2$ and $I_3$, with the weight of the $\frac{7}{8}$ given to the $I_2$ value and a weight of $\frac{1}{8}$ given to the $I_3$ values. This weighting scheme is acceptable for a scaling down operation that is less than 50%. When the scaling operation is above 50%, some aberrations occur in that the output pixel value is only weighted between the two adjacent pixels at which an input point occurs that is mapped into the output space for the corresponding step. This does not take in to account the varying pixel values and the information associated therewith that occur in the pixels dropped out between steps. For a multi-tap filter scheme, any given input point that is mapped into an output pixel would be averaged over multiple adjacent pixels with a decreasing weighting factor given to pixels on either side. For example, if the scaling factor were 1% with a shrink of 100, this would result in every 100th pixel being output. This would result in 98 pixels, from pixel two to pixel ninety-nine, being dropped out. With a multi-tap filter, pixel 100, for example, would have its value averaged over multiple pixels on either side thereof with a decreasing weighting factor given for the distance of a weighted pixel from pixel 100. These would be summed up an output to the display space. In the two-tap filter of the present invention, only the value associated with pixel 100 would be output. However, the concept is to account for aberrations by use of interpolation of pixel values around a point in the input space that is to be mapped into the output space.

Figure 9:
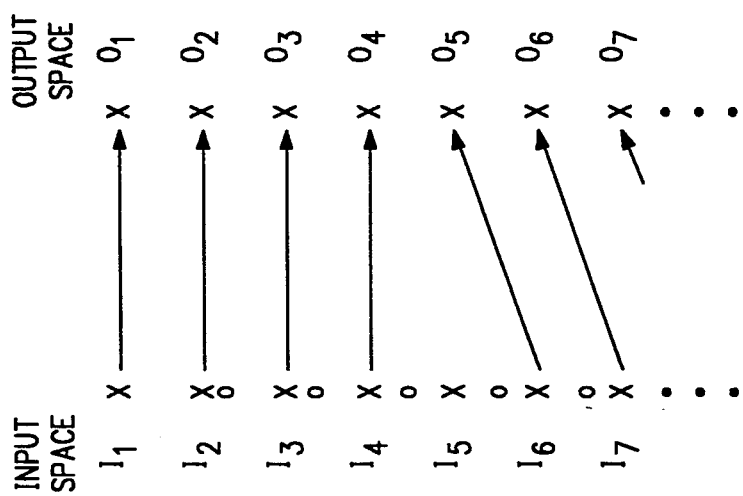
FIG. 9 illustrates a diagrammatic view of the input space and the output space for the vertical dimension.

Referring now to FIG. 9, illustrates a diagrammatic view of the input space and the output space for the vertical dimension. In the vertical dimension, the nearest neighbor algorithm is utilized. However, it should be understood that the weighted average utilized for each scan line as describe above with reference to FIG. 9, could also be utilized in the vertical direction. In the nearest neighbor algorithm, the position of the step to be mapped into the output space is first determined in the input space and the information associated with the scan line nearest to that step is mapped directly into the output scan line. For example, the information at the scan line in position $I_1$ would be mapped directly into the scan line position associated with $O_1$ in the output space. This would continue until the step position was at least midway or greater between two scan lines in the input space. For a shrink having steps of $1\frac{1}{3}$ in the input space for each step in the output space, this would occur between scan lines $I_5$ and $I_6$. Therefore, the information in scan line $I_4$ in the input space would be mapped directly into the scan line $O_4$, but the information in scan line $I_6$ would be mapped into the output scan line $O_5$, skipping the information in scan line $I_5$. This would continue until all the information were mapped.

Figure 10:
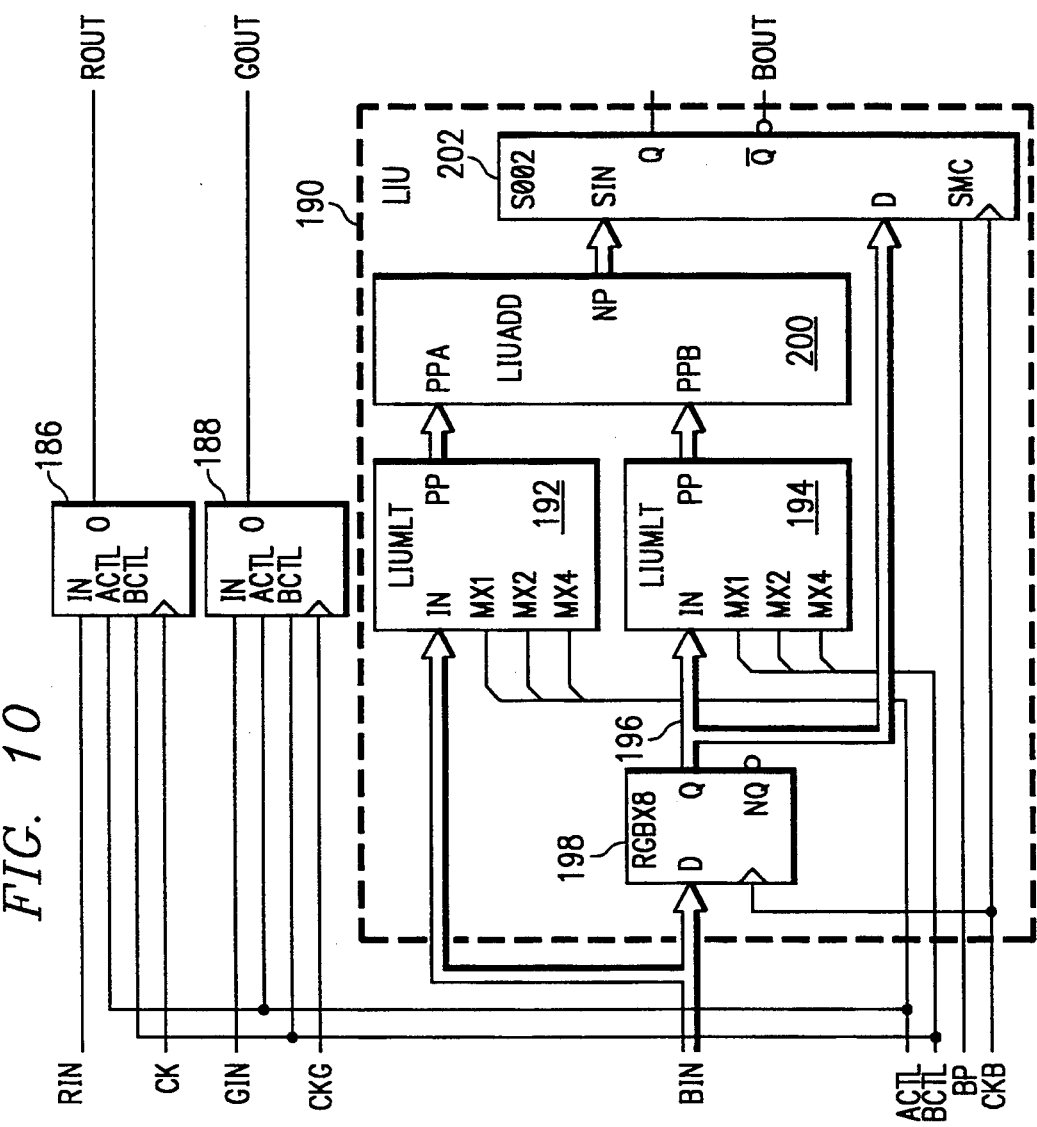
FIG. 10 illustrates a logic diagram for the linear resampling circuit 62.

Referring now to FIG. 10, illustrates a logic diagram for the linear resampling circuit 62. The linear resampling circuit 62 is comprised of three Linear Interpolation Units (LIU), 186, 188 and 190. The LIU 186 is dedicated for use with the red information, the LIU 188 is dedicated to the green information and the LIU 190 is dedicated to the blue information. The LIU 190 is illustrated in detail. Generally, the LIUs 186–190 are operable to receive the RGB input, perform a scaling operation and then output the appropriate RGB information after scaling thereof in response to generation of clock signals CKR, CKG and CKB. Each of the LIUs 186–190 also receive the respective inputs, $R_{IN}$, $G_{IN}$ and $B_{IN}$, and also an ACTL signal and a BCTL signal. The ACTL signal is associated with the N+1 pixel and the BCTL signal is associated with the N pixel. As will be described hereinbelow, this is utilized for the averaging operation illustrated in FIG. 8 for a given scan line. The controller is operable to determine when a scan line is valid in accordance with the nearest neighbor concept illustrated in FIG. 9. Therefore, for each scan line output as a valid output, the LIUs 186–190 perform the averaging operation of FIG. 8.

In the detail illustrated in LIU 190 of FIG. 10, two LIU multiplier circuits 192 and 194 are provided. The LIU 192 has a first input that is connected to the $B_{IN}$ input and the multiplier 194 has one input that is connected through an eight-bit data bus 196 to the output of a D-type flip flop bank 198. The D-input of the bank of flip flops 198 is connected to the Bi bus, which provides an eight-bit data input. Flip flop 198 is operable to provide a one-bit delay. This one-bit delay is utilized to provide an operation between two adjacent pixels. As described above, this is a 2-tap filter wherein only two adjacent pixels are examined and the average value therebetween output, as a function of a weighting factor corresponding to the position of the step between the two adjacent pixels. However, although only a 2-tap filter arrangement was disclosed, it should be understood that the output value for a given step could be averaged over a plurality of adjacent pixels in accordance with a predetermined weighting factor. For example, if a step occurred every ten pixels due to a reduction by a factor of ten, the value of every tenth pixel would be output. However, a multi-tap filter could be utilized wherein pixels on either side of the pixel at which the step occurred would be utilized to influence the value at the output. This weighting factor would be such that immediately adjacent pixels would have a high level of influence on the output, and pixels that were more farther removed would have less influence on the output value. The number of pixels that would be utilized in determining the value of a given output pixel would be defined as the "reach of the filter".

The other inputs to the multipliers 192 and 194 are received from the ACTL input and the BCTL input, each of which comprises a three-bit word. Each of these three-bit words represents a value from zero to zero with the total fraction for the sum of both the value of the ACTL word and the BCTL word equaling one. For example, the value of ACTL could be set equal to 0.125 and the value of BCTL would be equal to 0.875. The outputs of the multipliers 192 and 194 are input to two inputs of a full adder 200, the output of which is the new value for the blue constituent of the pixel. This is then input to one input of a multiplexer/flip flop 202, the output of which represents the blue constituent of the RGB output. The multiplexer/flip flop 202 is also operable to receive the output of the flip flop 198 for a bypass operation. In this operation, a bypass signal BP is input to the select input (SMC) of the multiplexer/flip flop 202 to select either the output of the flip flop 198 or the output of the full adder 200.

Figure 11:
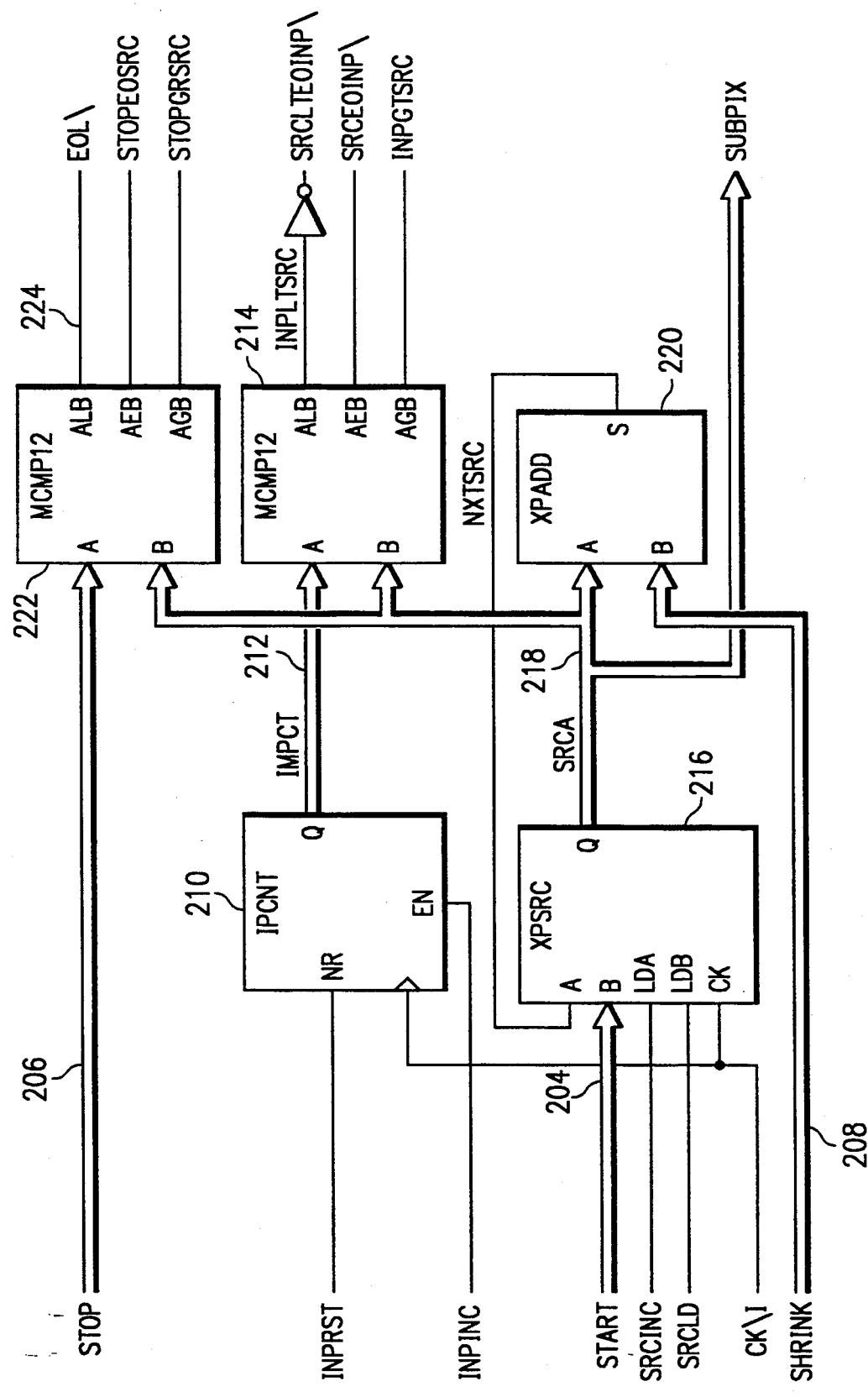
FIG. 11 illustrates a detailed logic diagram for the circuitry that selects pixels for each horizontal scan line.

Referring now to FIG. 11, illustrates a detailed logic diagram for the circuitry that selects pixels for each horizontal scan line. Three signals are generated, a start signal on a bus 204, a stop signal on a bus 206 and a shrink signal on a bus 208. Each of the buses 204–208 are 14-bit buses. The start and stop signals indicate the beginning and end of a scan line, whereas corresponding start and stop signals indicate the start and stop in the vertical direction. The pixel count is maintained by a pixel count circuit IPCNT 210, which is reset by an INPRST signal input to the reset input, with a clock signal utilized to clock the counter 210. An enabling signal INPINC is input on an enable input. The output is an eleven-put output that is output on a bus 212, labelled INPCNT, and this represents the pixel count from 0 to 640, for a 640×180 display. This bus is input to a comparator 214. A source register SPC 216 is provided, which receives on one input the start value from the bus 204, which is a 14-bit data word. Two signals, SRCINC and SRCLD are provided, the first input to a load input (LDA) and the second input to a load input (LDB). The appropriate logic in the control circuit determines when these are loaded. Initially, the start value is loaded and then the register 216 incremented to increment a value in the NTXA input, which is the A-input of the register 216, the B-input being the start value. The clock signal is also input to the register 216.

The Q-output of the register 216 comprises a 21-bit output representing the source register count. This is output on a bus 218. The bus 218 is input to a full adder 220, which also receives on one input thereof the value on bus 208, which is the shrink value. The adder 220 is operable to add the shrink value to the source register count on bus 218. If, for example, the scale factor were 50%, the shrink value would be equal to two. For each operation of the adder 220 and register 216, a value of two would be added to the value on bus 218. Therefore, the start value on bus 204 would be incremented by two for each operation of register 216 and adder 220. The eleven most significant bits (MSB's) of the bus 218, representing the integer value, are input to the other input of the comparator 214 for comparing with the input count. The comparator outputs three control signals, an inverted SRCLTEQINP (representing a source register count less than an equal to the input count) output, an SRCEQINP (representing a source register count equal to the input count) signal and an INPGTSRC signal (representing an input count greater than the source register count). These are input to the controller. Whenever a true comparison is made wherein the count value on bus 212 is greater than or equal to the source count on bus 218, a true output results from comparator 214 on output SRCEQINP. This is then input to the controller and then the register 216 is loaded with the output of the adder 220. For example, if the shrink value were two, the register 216 would be incremented initially when the count value equaled the start value, which was initially stored in the register 216. At that time, the shrink value would be added to the value on bus 218 and this loaded in register 216 and output on bus 218. When the input count had incremented by a value of two, this would again result in a true comparison on the output of comparator 214 and again increment register 216.

A comparator 222 is provided which compares the source count value on bus 218 with the stop value on bus 206. When a true comparison results, an end of line output EOL is generated on a control line 224, which is input to the controller. In addition, the controller receives the three most significant fraction bits from the bus 218, which comprises the three most significant bits of the ten least significant bits on bus 218. These bits are utilized to determine the value for ACTL and BCTL, as was described above.

Figure 12:
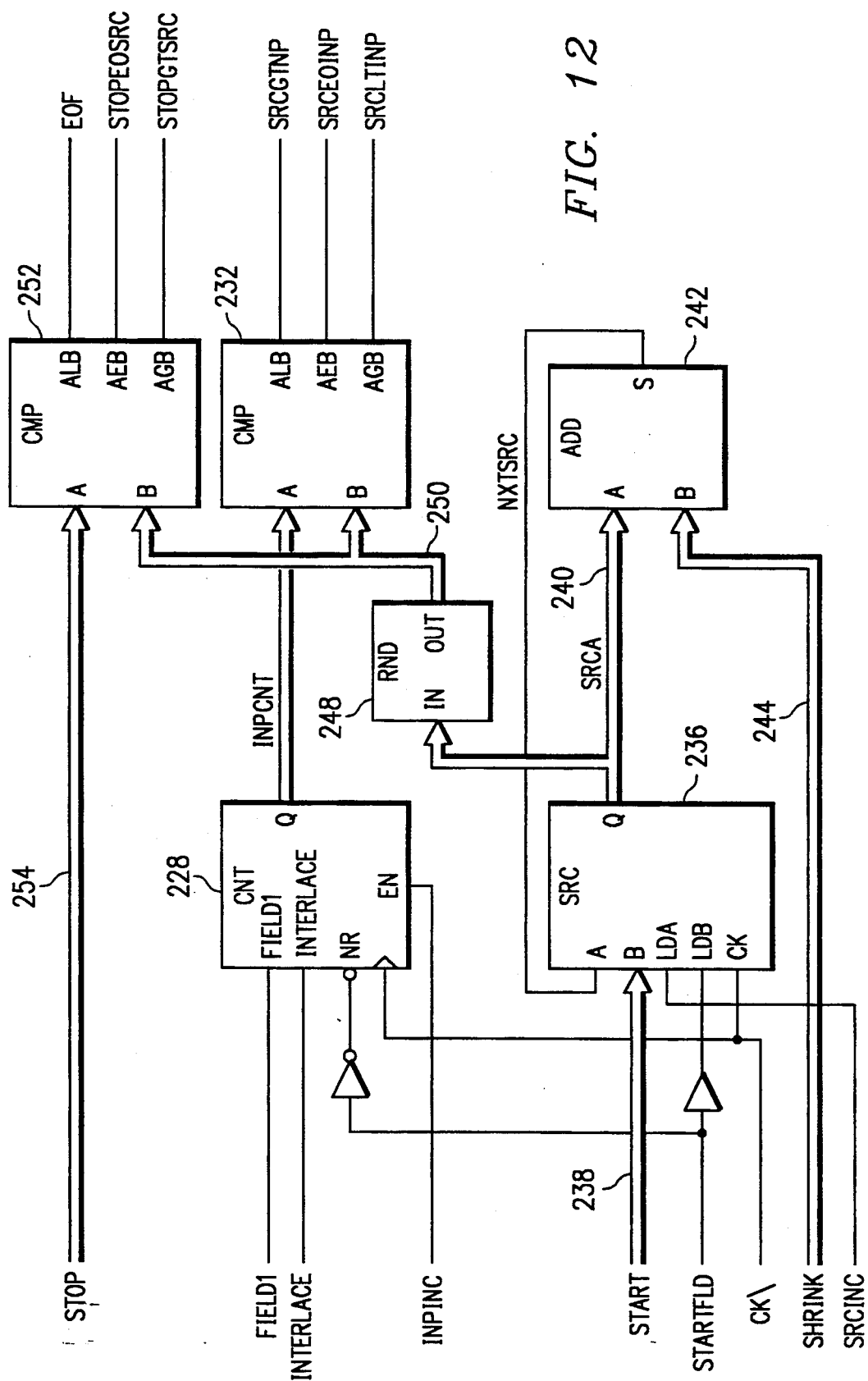
FIG. 12 illustrates a logic diagram for incrementing the circuit in the Y-direction to determine the nearest neighbor scan lines that are selected for output in the output display space.

Referring now to FIG. 12, illustrates a logic diagram for incrementing the circuit in the Y-direction to determine the nearest neighbor scan lines that are selected for output in the output display space. An input line counter INLCT 228 is provided which is similar to counter 210 in that it is operable to be reset to a zero value and then receive an increment signal INPINC on an enable input to increment the count value. It is reset by the start field signal STARTFLD, which is inverted through an inverter 230. The output of the counter 228 comprises an 11-bit output INPCNT, which represents the input count value, which is input to the A-input of a comparator 232. The comparator 232 operates similar to the comparator 214. A count register 236 is provided that operates similar to the count register 216. The count register 236 receives the start value on an input bus 238 and outputs a source register count on a 21-bit bus 240. The source register count on bus 240 is input to one input of a full adder 242, the other input thereof connected to a bus 244 to receive a shrink value. The shrink value may be the same as the shrink value on bus 208, but the scaling factor can be different for the X- and the Y-directions. The adder 242 is operable to add the shrink value to the source register count on bus 240 and output this to the NXTA input of register 236. As was described above with respect to FIG. 11, the initial start value is loaded in with the STARTFLD signal into the LDB input of register 236 and then the SRINC input increments the register 236 on the LDA input to load the value from the output of the adder 242 to the NXTA input of the register 236. This occurs as a controller output that operates in response to a compare output of the comparator 232 and will be described hereinbelow.

The twelve most significant bits of the bus 240 are input to a rounding circuit WPRND 248, which is operable to add a fraction bit of 0.5 to the value on bus 240 and then truncate it. This results in rounding upward to the next line. This value is then output on a bus 250 for input to the other input of comparator 232 and also the input of the end of field comparator 252. The other input of the comparator 252 is the stop value, which is an 11-bit input on a bus 254. The comparator output is labelled EOF, representing a true value when the end of field is present.

The circuit of FIG. 12 operates similar to the circuit of FIG. 11, with the exception that the comparator 232 only outputs a true comparison for a nearest neighbor operational mode, as described above with reference to FIG. 9. It essentially drops lines as a result of the rounding circuit 248, which will round up by a factor of 0.5 from the value on bus 240.

Figure 13:
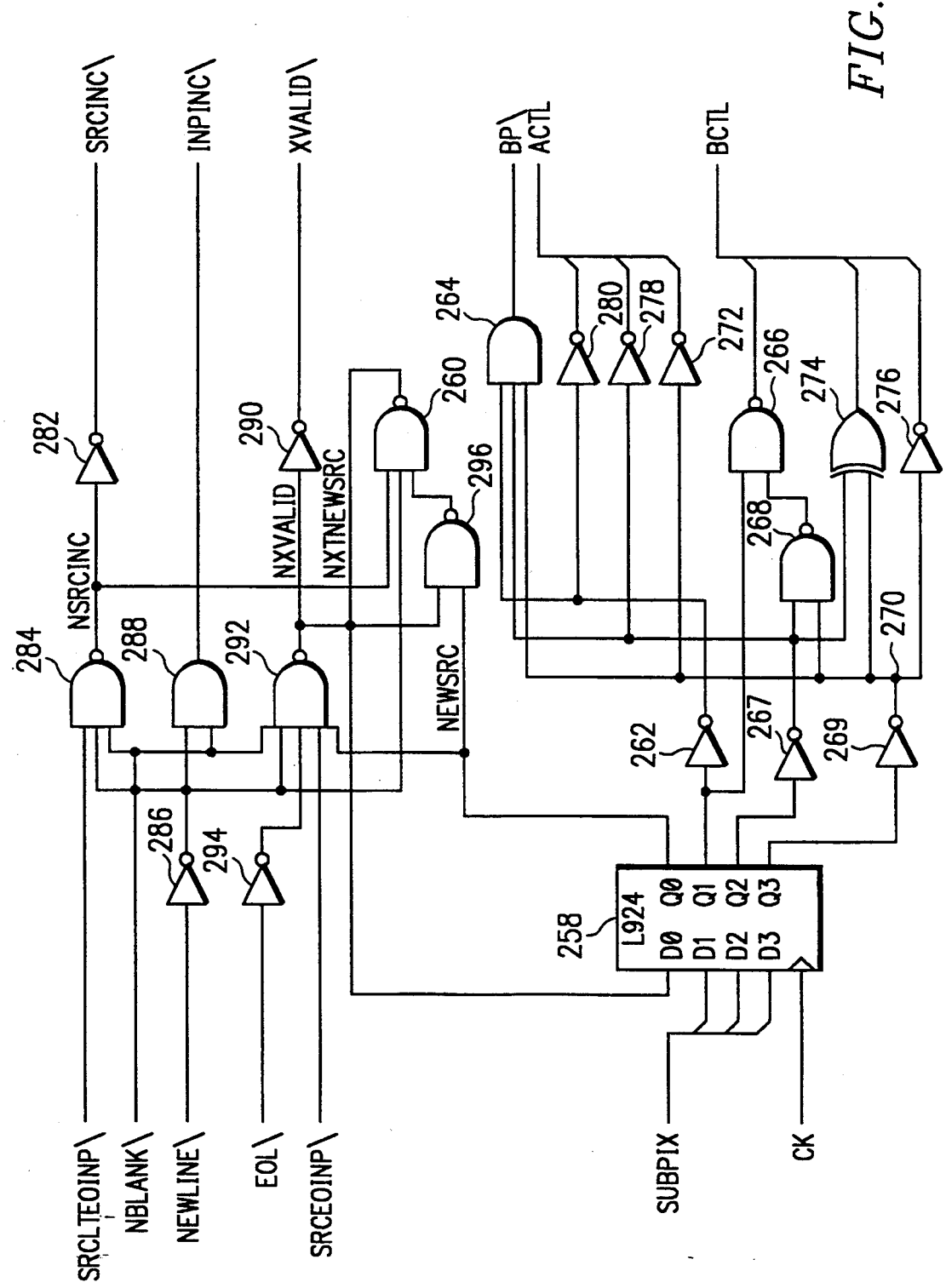
FIG. 13 illustrates a portion of the control circuit for generating the various control signals and also for generating the ACTL and BCTL signals.

Referring now to FIG. 13, illustrates a portion of the control circuit for generating the various control signals and also for generating the ACTL and BCTL signals. The fraction bits output from the circuit of FIG. 11 are input to a 3-bit register 258, which is controlled by the clock signal CK for loading the MSB bits therein. A fourth bit is input from a line NXTNEWSRC, which is received from the output of a NAND gate 260. This results in a 4-bit word being output from outputs Q0–Q3. The Q1 output is input through an inverter 262 to one input of an AND gate 264 and also to one input of a NAND gate 266. The AND gate 264 outputs the BP value, which is utilized to essentially bypass the averaging portion of the LIU of FIG. 10. The Q2 output is input through an inverter 267 to one input of a NAND gate 268. The Q3 output is input through an inverter 269 to a node 270. Node 270 is connected to one input of AND gate 264, the 0-bit of the ACTL output through an inverter 272, the other input of the NAND gate 268 and one input of an exclusive OR gate 274 and through an inverter 276 to the 0-bit of the BCTL output. The output of inverter 267 is also input to one input of AND gate 264, the 1-bit of the ACTL output through an inverter 278 and the other input of the XOR gate 274. The output of inverter 262 is also connected through an inverter 280 to the 2-bit output line of the ACTL output. The output of the XOR gate 274 is connected to the 1-bit line of the BCTL output and the output of the NAND gate 266 is connected to the 2-bit line of the BCTL output. The above-described circuitry comprises a decoder for the MSB fraction bits. The ACTL output comprises the weighted value for the N+1 pixel and the BCTL output comprises the weighted value for the N pixel.

The SRC increment signal is generated on the output of an inverter 282, which has the input thereof connected to the output of a three-input NAND gate 284. One output of the gate 284 is connected to a signal SRCLTRINP, which is one output of the comparator 214. One input of gate 284 is connected to the NBLANK signal, which is a blanking signal and the other input is connected through an inverter 286 to a new line signal NEWLINE. Therefore, the SRCINC signal is incremented generally when the output of comparator 214 changes.

The INPINC control signal that increments the counter 210 is generated on the output of a two-input AND gate 288. One input thereof is connected to the output of inverter 286 and the other input thereof is connected to the NBLANK signal. Therefore, the INPINC signal is generated for each new line in the field, indicating the start of a new pixel scan.

The XVALID signal is generated on the output of an inverter 290, which has the input thereof connected to the output of a five-input NAND gate 292. One input of gate 292 is connected to the NBLANK signal, one input is connected to the NEWLINE signal on the output of inverter 286, one input is connected to the end of line signal EOL through an inverter 294, one input thereof is connected to an SRCEQINP output, which is output by the comparator 232 and the other input is connected to the Qφ output of the register 258, which is labelled NEWSRC. Therefore, XVALID is generated only when it is determined that a scan line is to be included in the field, as a result of the output of the comparator 232 and whenever the NEWLINE signal is generated.

The output of gate 292 is also input to one input of a NAND gate 296, the other input of which is connected to the NEWSRC output signal on the Qφ output of register 258. The output of gate 296 is input to one input of the three-input gate 260. The other two inputs are connected to the output inverter 286 to receive the inverted NEWLINE signal and also to the output of the NAND gate 284, which is the inverted increment signal. Therefore, the signal NXTNEWSRC signal is generated, a function of the XVALID signal, the increment signal, and also the NEWLINE signal. Although not illustrated above, a YVALID signal is generated whenever a line is to be output. This is utilized by the system to recognize that the overall system is to output an RGB value. These signals are then output to the LIU to generate the $R_{OUT}$, $G_{OUT}$ and $B_{OUT}$ signals, as a valid pixel.

Figure 14:
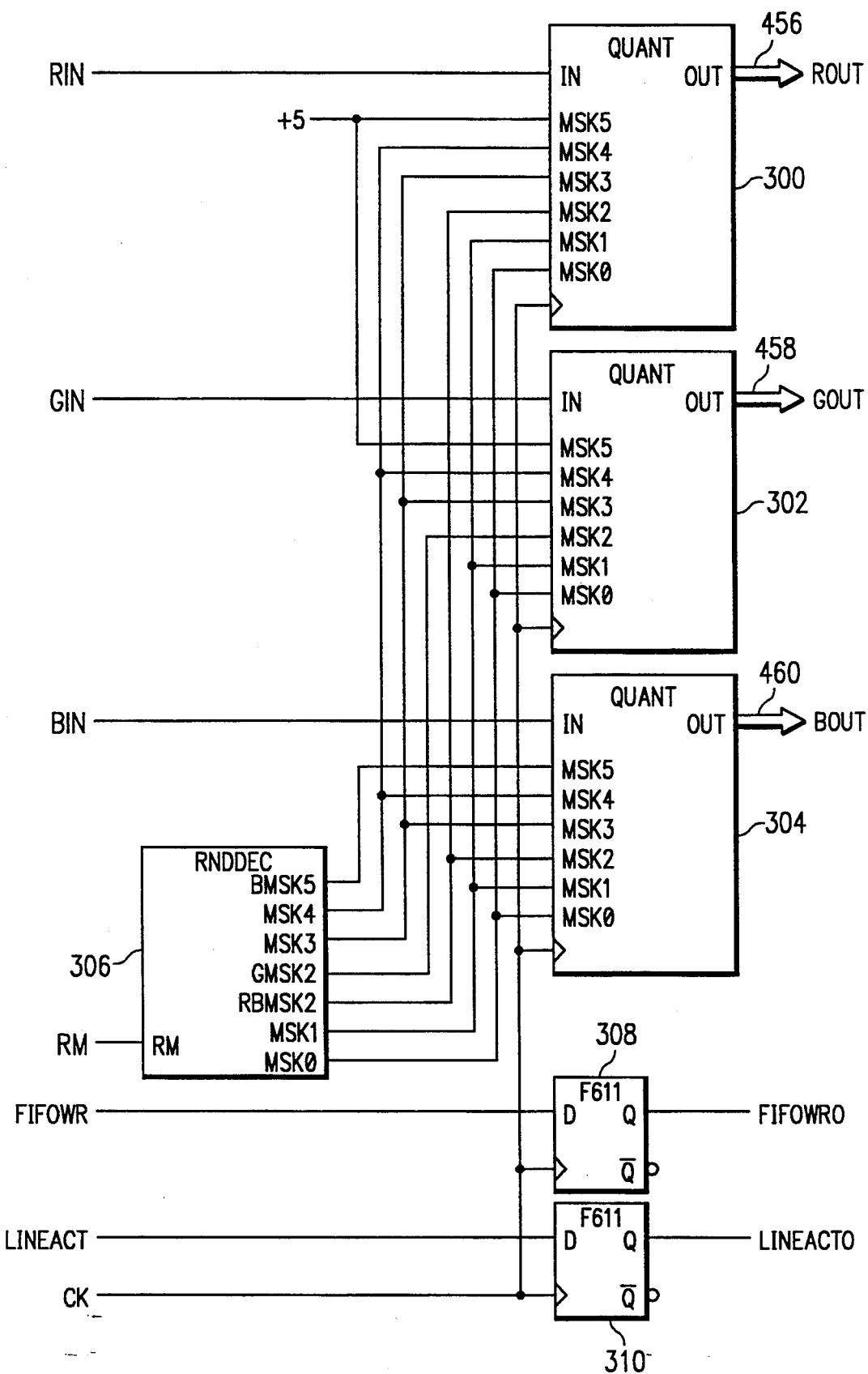
FIG. 14 illustrates a logic diagram for the quantization processor 64 of FIG. 4.

Referring now to FIG. 14, illustrates a logic diagram for the quantization processor 64 of FIG. 4. The quantization processor 64 is operable to provide an error diffusion for adjacent output pixels. The general concept of the technique has been applied to A/D converters and is described in Dimitris and Anatassiou, "Error Diffusion Coding for A/D Conversion", *IEEE Trans Cir. and Sys.*, vol. 36. No. 9, September 1989, pp. 1175–1186, which reference is incorporated herein by reference. This technique provides for rounding off of a given digital value and adding the error to the next sequential digital value such that the error is accumulated. The system of the present invention saves the error in an error register and then adds it with the next sequential value.

There are three quantization processors 300, 302 and 304, provided for the red, the green and the blue constituent values in the RGB format. The 24-bit input is divided up into seven bits each, which are input to each of the quantization processors 300–304. Additionally, masking bits are input to a mask input MASK-0–MASK5 in each of the quantization processors 300–304. These masking bits are generated in a rounding decoder RNDDEC 306, which receives a three-bit input $R_{MO}$. The system of the present invention provides that a variable number of least significant bits can be selected for the rounding operation in the quantization processors 300–304. The rounding decoder 306 allows for different rounding bits to be utilized as the remainder. For example, no rounding could be selected to result in a format of 888, one bit of rounding could be selected for a format of 777, two bits of rounding could be selected for a format of 666, three bits can be selected for rounding for a format of 555, four bits of rounding could be selected for the format of 444, five bits of rounding could be selected for the format of 333, and the decoder 306 also provides for the formats of 565 and 332. Therefore, for example, the RGB output could select a 333 output to result in only nine bits of total information (three bits for each color) being output. This significantly reduces the information in the RGB format, but the error diffusion utilized in the rounding reduces the severity of this rounding operation. The entire operation is clocked by the clock signal CK, which clock signal is then input to the clock signal of two D-type flip flops 308 and 310, which are operable to clock through control signals FIFOWR for the write operation on the FIFO and the line activation signal LINEACT.

Figure 15:
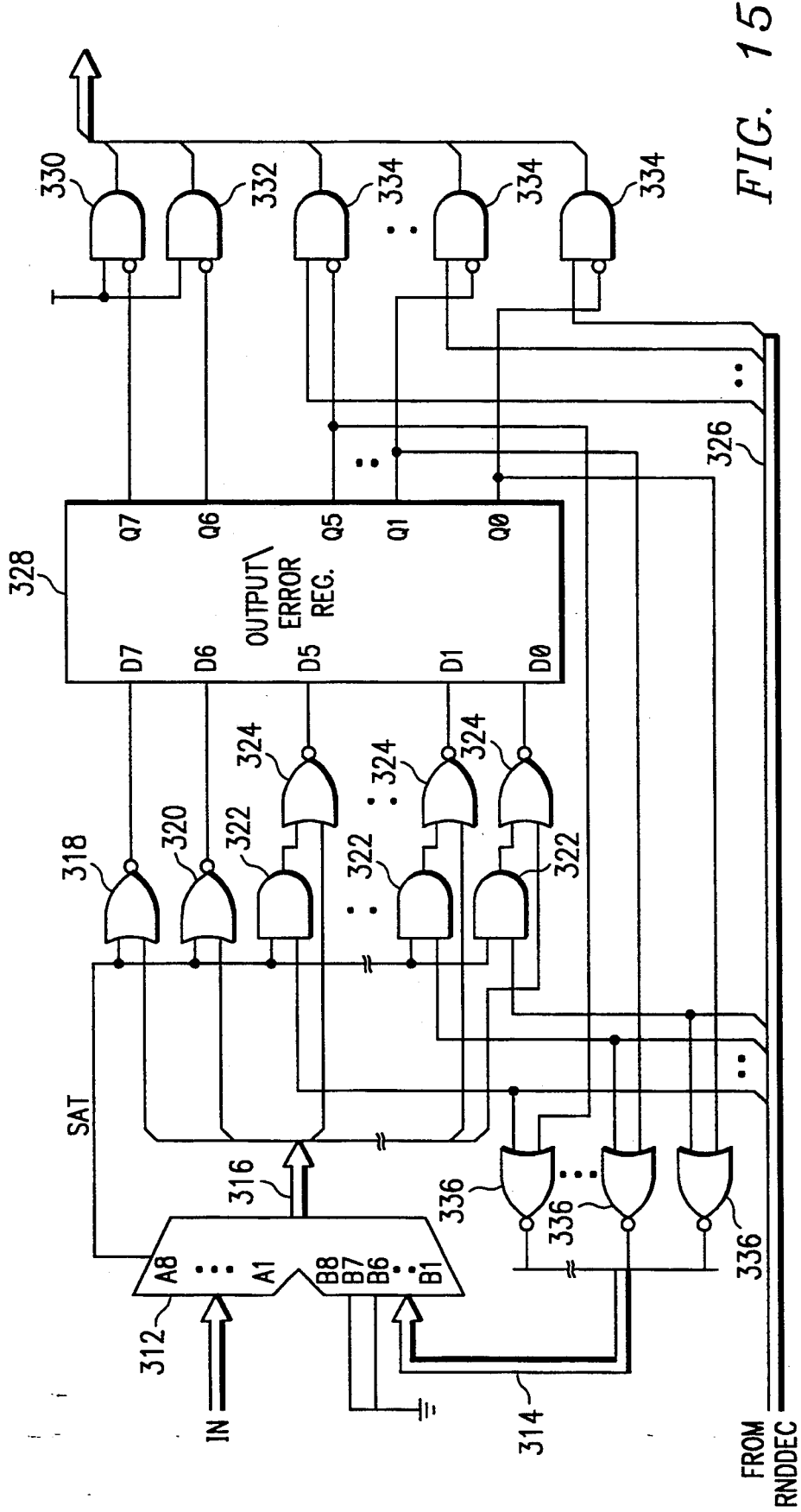
FIG. 15 illustrates a logic diagram for the quantization processor 300–304.

Referring now to FIG. 15, illustrates a logic diagram for the quantization processor 300–304. The 7-bit input from the $R_{IN}$, $G_{IN}$ and $B_{IN}$ outputs are input to the A-input of a full adder 312. The B-input has the upper two bits, B7 and B8, connected to a low logic signal and the remaining six bits connected to an error bus 314. The output of the adder is comprised of an eight-bit output on a bus 316. The most significant bit is input to one input of a NOR gate 318 and the next lower bit to the MSB is input to one input of a NOR gate 320. The other input of NOR gates 318 and 320 are input to the saturate output of the adder 312. In the present embodiment, a minimum of two bits will always be output for each of the quantization processors 300–304, and therefore, the two most significant bits will not be rounded off.

The remaining six bits each are input to one input of an AND gate 322, the output of which is input to one input of a NOR gate 324. The other input of the AND gates 322 are connected to a respective one of the six masking bits received from the rounding decoder 306 on a bus 326. The other input of the NOR gates 324 are connected to the respective ones of the bits on the bus 316. The outputs of each of the NOR gates 318 and 320 and all the NOR gates 324 are input to data inputs D0–D7 of an output/error register 328. The register 320 is operable to store the bits determined to be output bits and also to store the bits determined to be error or truncated bits.

The two most significant bits on outputs Q6 and Q7 are input through an inverting input on AND gates 330 and 332, respectively. The remaining six outputs Q0–Q6, are connected to respective inverted inputs on six AND gates 334. The other inputs of AND gates 330 and 334 are connected to a high logic signal and the other inputs of AND gates 334 are connected to the respective ones of the six bits on the error bus 326.

The outputs Q0–Q6 from the register 328 are also input to one input of the bank of six NOR gates 336, one for each of the respective outputs. The other inputs to each of the OR gates 336 are connected to respective ones of the bits on the error bus 326. The outputs of gates 336 are connected to the error bus 314.

In operation, the masking word is received from the rounding decoder 306 and the outputs from the register 326 are either selected as bits to be truncated to provide an error to be added to the next sequential pixel value or they are selected as outputs. Therefore, only the bits not selected as error bits will be output, with the remaining outputs being truncated from the value of the input word. These are held in the register for a single clock cycle and then added back to the next word. Whenever a bit is not selected, the error bit will be a logic "1". This will therefore hold one side of the respective AND gate 334 at a high value, such that the AND gate 334 will gate through the respective one of the outputs Q0–Q5. Similarly, the NOR gate 336 associated with that bit will force the output thereof low on the B-input of the adder 312. Further, in a saturated condition, only the output data bits will be saturated, since only the AND gates 322 associated with bits not selected for truncation will have one side of the AND gate 322 high.

Figure 16:
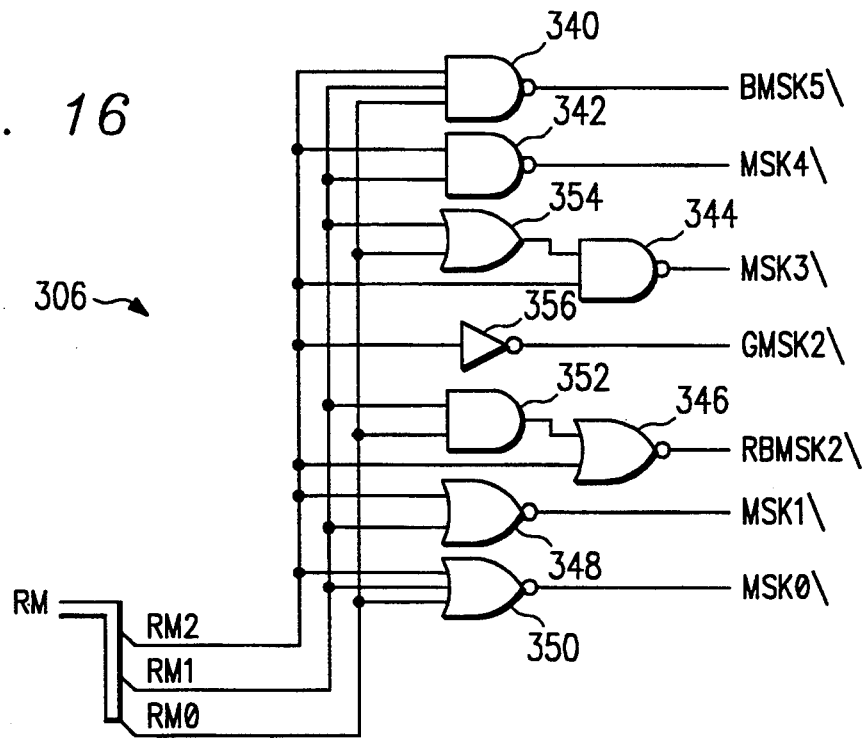
FIG. 16 illustrates a logic diagram for the rounding decoder 306.

Referring now to FIG. 16, illustrates a logic diagram for the rounding decoder 306. The rounding word $R_M$ is a three-bit word, with the most significant bit $R_{M2}$ input to one input of the three-bit input NAND gate 340, one input of a two-input NAND gate 342, one input of a two-input NAND gate 344, one input of a two-input NOR gate 346, one input of a two-input NOR gate 348, and one input of a three-input NOR gate 350. The RM1 bit is input to one input of the NAND gate 340, one input of the NAND gate 342, one input of a two-input AND gate 352, the output of which is connected to the other input of the NOR gate 346, one input of the NOR gate 348 and one input of the NOR gate 350. RM1 is also input to one input of an OR gate 354, the output of which is connected to the other input of the NAND gate 344. The RM0 bit, the least significant bit, is input to the remaining input of NAND gate 340, the other input of OR gate 354, the other input of AND gate 352 and the remaining input of NOR gate 350. NAND gate 340 outputs the BMSK5 output, NAND gate 342 outputs the BMSK4 output, NAND gate 344 outputs the BMSK3 output, NOR gate 346 outputs the $RBMSK_2$ signal, NOR gate 348 outputs the RBMSK1 signal and NOR gate 350 outputs the RBMSK0 signal. The GMSK2 signal is generated with an inverter 356 having the input thereof connected to the RM2 line.

Figure 17:
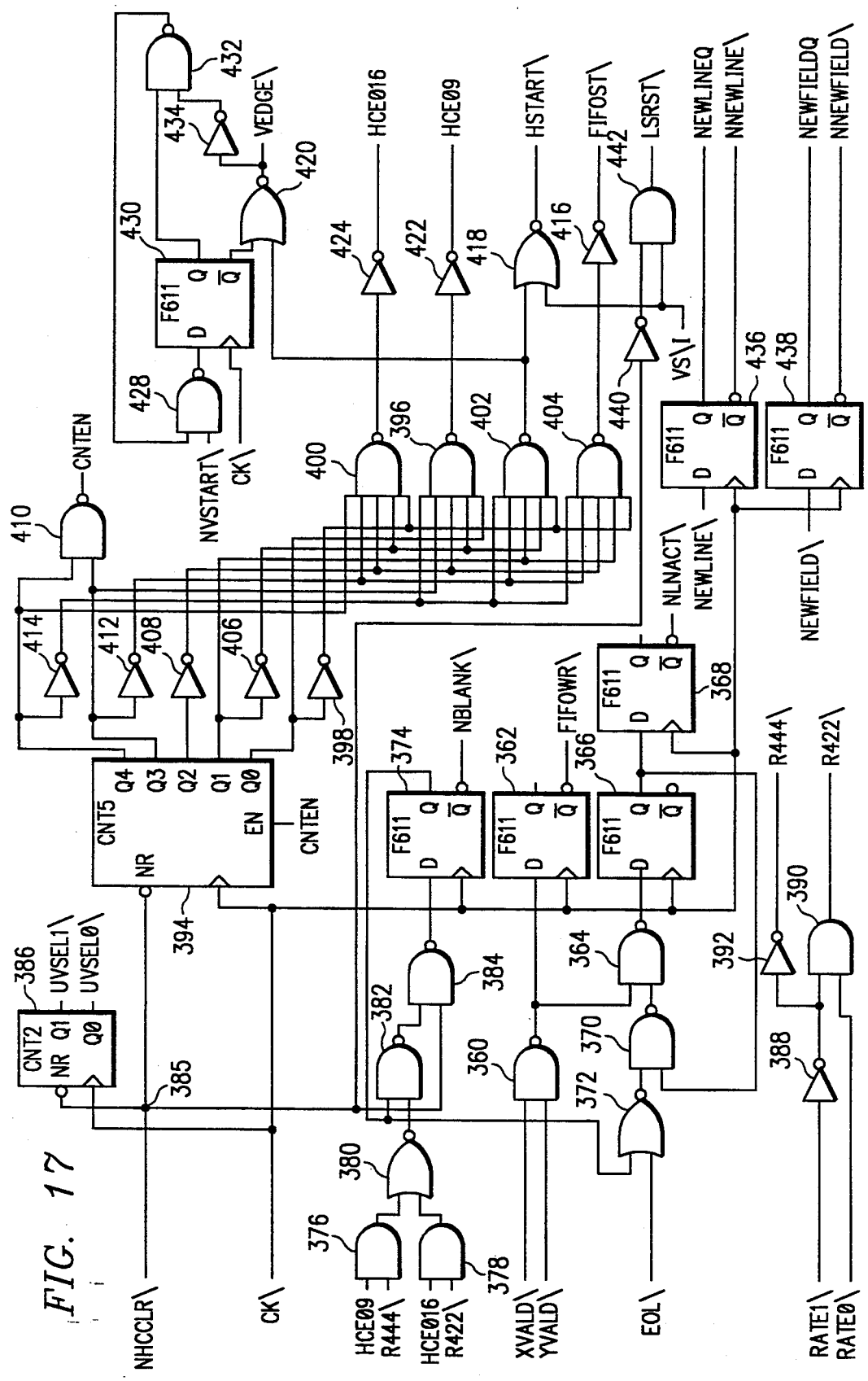
FIG. 17 illustrates a logic diagram of a miscellaneous control circuit (MISCCTL) for generating some of the miscellaneous control signals.

Referring now to FIG. 17, illustrates a logic diagram of a miscellaneous control circuit (MISCCTL) for generating some of the miscellaneous control signals. The XVALID and YVALID signals are input to respective inputs of a NAND gate 360, the output of which is input through the D-input of a D-flip flop 362. The Q-bar output provides the FIFO write signal FIFOWR. The output of gate 360 is also input to one input of a NAND gate 364, the output of which is connected to the D-input of a D-type flip flop 366. The output of flip flop 366 is input to the D-input of a D-type flip flop 368, the Q-bar output of which provides the line activation output NLNACT. The output of flip flop 366 is also input to one input of a NAND gate 370, the output of which is connected to the other input of gate 364. The other input of gate 370 is connected to the output of a NOR gate 372, one input of which is connected to the end of line (EOL) output of the comparator 222 on line 224 in FIG. 11. The other input thereof comprises a BLANK signal which is output from the Q-output of a D-type flip flop 374.

An R444 input is input to one input of an AND gate 376, an R422 input is input to one input of an AND gate 378, and the remaining inputs of the gates 376 and 378 are connected to internal signals HCEQ9 and HCEQ16. The outputs of gates 376 and 378 are input to respective inputs of a NOR gate 380, the output of which is connected to an input of the NAND gate 382, the output of which is connected to one input of a NAND gate 384. The other input of gate 384 is connected to a node 385, which is connected to the NHCCLR signal that represents the beginning of a new line on a horizontal scan. The other input of NAND gate 382 is connected to the BLANK output of flip flop 374, and the other input of gate 384 is connected to the NR output of a two-bit counter 386. Counter 386 outputs the UVSEL1 signal and the UVSEL0 signal. The output of NAND gate 384 is connected to the D-input of the flip flop 374. The Q-bar output of flip flop 374 provides the NBLANK blanking output.

Two rate selection lines are provided for selecting between the R444 and the R422 YUV format ratios. The RATE1 input is input through an inverter 388 to one input of an AND gate 390 and also through an inverter 392 to provide the R444 output. The input RATE0 is input to the other input of the gate 390, the output of gate 390 representing the R422 output. The R444 and R422 outputs are input to gates 376 and 378.

A counter 394 is provided, which is a five-bit counter having the reset input connected to node 385 and the NHCCLR signal and the clock input connected to the clock signal. The enable input is connected to a counter enable signal. The Q$\phi$ output is connected to one input of a NAND gate 396 and through an inverter 398 to one input of a NAND gate 400, one input of a NAND gate 402 and one input of a NAND gate 404. The Q1 output is connected to one input of the NAND gate 404 and also through an inverter 406 to one input of gate 400, one input of gate 396 and one input of gate 402. The Q2 output is connected through an inverter 408 to one input of the gate 400, one input of gate 396, one input of gate 402 and one input of gate 404. The Q3 output is connected to one input of a NAND gate 410, the output of which provides the counter enable signal, and through an inverter 412 to one input of gate 400, one input of gate 402 and one input of gate 404. The Q4 output is connected to the other input of gate 410 and also through an inverter 414 to one input of gate 396, one input of gate 402 and one input of gate 404.

The output of gate 404 provides, through an inverter 416, the FIFO reset signal. The output of gate 402 is connected to one input of a NOR gate 418, the other input of which is connected to an input VS, the output of NOR gate 418 providing the HSTART signal for the start of a line. The output of gate 402 is also connected to one input of a NOR gate 420, the output of which provides the vertical start signal VEDGE. The output of gate 396 is connected through an inverter 422 through to provide the HCEQ9 output that is connected to one input of gate 376. The output of gate 400 is connected through inverter 424 to provide the one input to a gate 378. The vertical start signal NVSTART is input to one input of a NAND gate 428, the output of which is connected to the D-input of a D-type flip flop 430. The other input of gate 428 is connected to the output of a NAND gate 432. One input of gate 432 is connected to the Q-output of flip flop 430 and the other input is connected through an inverter 434 to the output of NOR gate 424. The other input of NOR gate 420 is connected to the inverted Q-bar output of flip flop 430.

The NEWLINE input is connected to the D-input of a D-flip flop 436, the Q-bar output of which provides the inverted NEWLINE signal, which is delayed by one clock cycle. Similarly, the NEWFIELD signal is input to the D-input of a D-type flip flop 438, the Q-bar output of which provides the NNEWFIELD output, delayed by one clock cycle. The NHCCLR signal on node 385 is input through an inverter 440 to one input of an AND gate 442, the other input of which is connected to the VS signal, to provide the reset signal LSRST.

Figure 18:
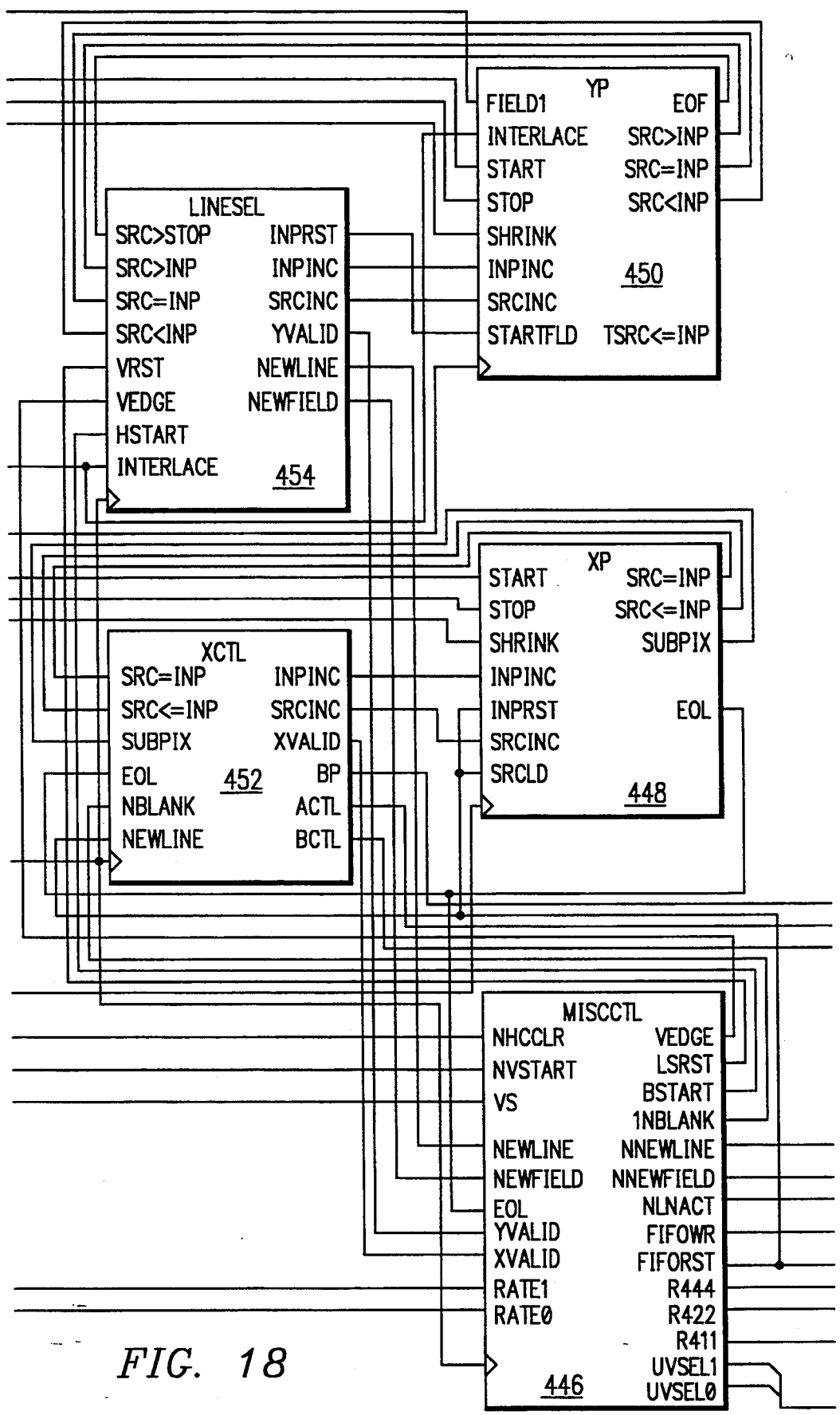
FIG. 18 illustrates an overall block diagram of the control unit 68.

Referring now to FIG. 18, illustrates an overall block diagram of the control unit 68. A miscellaneous control block MISCCTL 446 is provided which represents the logic diagram of FIG. 17. An XP block 448 is provided which represents the circuitry of FIG. 11. A YP block 450 is provided which represents the circuitry of FIG. 12. An XCTL block 452 is provided that represents the logic diagram of FIG. 13. A LINESEL block 454 is provided which represents the circuitry that is operable to control the YP block 450. The LINESEL block 454 is operable to generate the INPRST, INPINC and SRCINC signals for input to the YP block 450. The three outputs of the comparator 232 are input to the block 454. The VRST, VEDGE and HSTART inputs that are generated by the MISCCTL block 446 are also input to the LINESEL block 454. An INTERLACE input is input to both the block 454 and also to the YP block 450, this providing for INTERLACE or for non-INTERLACE operation, which is a conventional operation. The block 454 also outputs a YVALID output for input to the block 446 and also the NEWLINE and NEWFIELD outputs for input to the MISCCTL block 446. The LINESEL block 454 is generally operable to receive information generated in the YP block 450 and determine whether the present line value is valid, with the MISCCTL circuit operable to generate the various timing and control signals that are necessary to generate the various FIFO control signals. This determines whether the line is written to the FIFO. Similarly, the XVALID signal when output from the XCTL block 452 is operable to control the MISCCTL circuit 446 to control the (FIFO) write FIFOWR signal.

Figure 19:
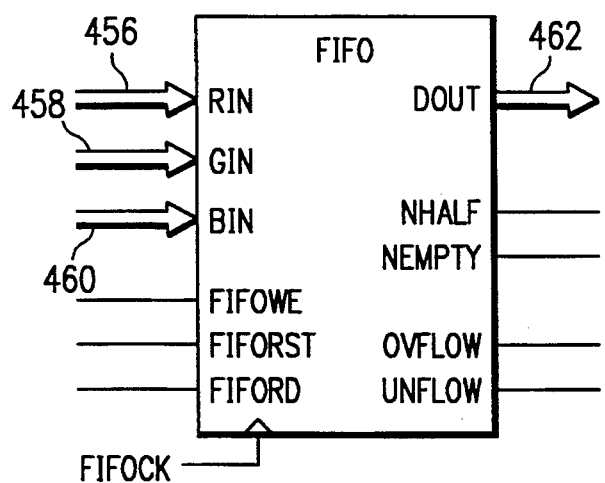
FIG. 19 illustrates a diagrammatic view of the FIFO data input is received from the quantization processor of FIG. 14 as the $R_{OUT}$, $G_{OUT}$ and $B_{OUT}$ signals on three buses 456, 458 and 460.

Referring now to FIG. 19, illustrates a diagrammatic view of the FIFO data input is received from the quantization processor of FIG. 14 as the $R_{OUT}$, $G_{OUT}$ and $B_{OUT}$ signals on three buses 456, 458 and 460. The write enable signal is received from the quantization processor of FIG. 14, which is delayed by the flip flop 308 as the FIFOWR from the MISCCTL block 446 of FIG. 18 and delayed by flip flop 308. The FIFORST signal is received from the output of the MISSCTL circuit 446 and the FIFOREAD signal is received external to the system. Further, the overflow and underflow signals are output by the FIFO, these signals being OVFLOW and UNFLOW, respectively. Additionally, an empty flag NEMPTY and a half full flag NHFULL are output. The data is output on a 24-bit bus 464. Therefore, it can be seen that the FIFO allows the RGB data to be input at one data rate and output at a second data rate, dependent upon the read information. This FIFO is a conventional FIFO.

In summary, there has been provided an integrated pixel processing device that includes circuitry for receiving either YUV or RGB formatted input data, with the YUV formatted data received at multiple pixel ratios of 444 or 422. The processor is operable to receive the YUV formatted data at any rate and convert it to the maximum ratio of 444 to provide the maximum amount of information. Once converted to YUV 444, the data is then converted to an RGB format. The RGB formatted pixel information is then scaled in accordance with a predetermined scaling algorithm. The scaling algorithm utilizes an averaging technique that averages information from a plurality of pixels disposed around a point in the input space that is to be mapped into the output space. The averaged information is then mapped into a pixel in the output space. The scaling is initiated at a predefined scan line and terminated at a predefined scan line with each scan line started at a predetermined point along the horizontal dimension in the input display space and terminated at a predetermined point along each horizontal line in the input display space. Once the pixel information has been scaled down, the information for each of the R-, the G- and the B-inputs are truncated to reduce the amount of information therein. The truncated data has an error associated therewith, and this error is diffused over adjacent pixels. The output of the rounding and truncating circuit is then input to a FIFO for extraction by the higher level system.

Although the preferred embodiment has been described in detail, it should be understood that various changes, substitutions and alterations can be made therein without departing from the spirit and scope of the invention as defined by the appended claims.

What is claimed is:

1. A video scaling apparatus for scaling down video information originating in an input device end displaying the resulting scaled down video information in a designated window within a screen of an output video device, comprising:

a scaling input for receiving scaling information;

a video input for receiving real time input video information from the input video device;

means for designating a said window within said screen of said output video device;

an output for outputting scaled down video information into said designated window within said screen of said output video device in substantially real time; and an averaging circuit coupled to said scaling input, said video input, and said output for averaging received said video information corresponding to a predetermined area within a screen of said input video device in accordance with a predetermined averaging algorithm and outputting the averaged video information through said output into a predetermined area of said designated window within said screen of said output video device, the ratio of said predetermined area of said screen of the input video device to said predetermined area of said window within the screen of said output video device being determined by the scaling information received on the scaling input.

2. The video scaling apparatus of claim 1 and further comprising a control circuit for receiving location parameters for determining the location of said predetermined area of said screen of said input video device that is to be scaled down for output to said window within said screen of said output video device.

3. The video scaling apparatus of claim 1 wherein said screen of said input video device is substantially the same size as said screen of said output video device wherein each of the input and output video screens are updated in frames and further comprising a buffering device for allowing the output averaged video information to be output at a different rate than the rate of the video information in the input video device.

4. The video scaling apparatus of claim 1 wherein the video information of said screen of said input video device is comprised of an array of pixels of a first predetermined array size and said window within said screen of said output video device is comprised of an array of pixels of a second predetermined array size.

5. The video scaling apparatus of claim 4 wherein said averaging circuit comprises an interpolation filter for generating the weighted average of at least two pixels disposed proximate to the point in the screen of the input video device that is to be mapped to a point in the screen of the output video device in accordance with the scaling information, the point in said screen of said output video device comprising a pixel in said screen having a value equal to the weighted average value generated by said interpolation filter.

6. The video scaling apparatus of claim 5 wherein said interpolation filter operates only on pixels in a horizontally adjacent relationship and said averaging circuit further comprises a nearest neighbor circuit for selecting rows of said video information within the rows of pixels in said screen of said input video device that are most proximate to said point in said screen of said output video device in accordance with a nearest neighbor algorithm.

7. A video scaling apparatus for scaling down video information originating in an input video device and displaying the resulting scaled down video information in a designated window within a screen of an output video device, comprising:
   a scaling input for receiving scaling information;
   a video input for receiving real time input video information in the form of an array of input pixels from the input video device;
   means for designating a said window within said screen of said output video device;
   an output for outputting scaled down video information into said designated window within said screen of said output video device in the form of an array of output pixels and in substantially real time; and
   a processing circuit coupled to said scaling input, said video input, and said output for processing received said video information corresponding to a predetermined area within a screen of said input video device in accordance with a predetermined processing algorithm and outputting the processed video information through said output into a predetermined area of said designated window within said screen of said output video device such that ones of the output pixels are functions of at least two of the input pixels, the ratio of said predetermined area of said screen of said input video device to said predetermined area of said window within said screen of said output video device being determined by the scaling information received on the scaling input.

8. The video scaling apparatus of claim 7 and further comprising a control circuit for receiving location parameters for determining the location of said predetermined area of said screen of said input video device that is to be scaled for output to said window within said screen of said output video device.

9. The video scaling apparatus of claim 7 wherein said processing circuit comprises an interpolation filter for generating the weighted average of at least two pixels disposed proximate to the point in the screen of the input video device that is to be mapped to a point in the screen of the output video device in accordance with the scaling information, the point in said screen of said output video device comprising one of the output pixels, the output pixel having a value equal to the weighted average value of the two input pixels generated by said interpolation filter.

10. The video scaling apparatus of claim 9 wherein said interpolation filter operates only on input pixels in a horizontally adjacent relationship and said processing circuit further comprises a nearest neighbor circuit for selecting rows of input pixels within the rows of pixels in the screen of said input video device that are most proximate to said point in the screen of said input video device that is to be mapped into said point in the screen of said output video device in accordance with a nearest neighbor algorithm.

11. An integrated single chip video processor, comprising:
   a video input for receiving a real time video input signal in a first video format at a predetermined rate, said video input signal representing a screen of an input video device;
   conversion circuitry for converting said video input signal to a second video format having a higher video bandwidth, said conversion circuitry outputting converted video;
   a video scaling device for scaling down to a designated window within a screen of an output video device the converted video representing said screen of said input video device, said video scaling device including:
      a scaling input for receiving scaling information;
      an output for outputting scaled down video information into said window within said screen of said output video device in substantially real time; and
      means for designating a said window within said screen of said output video device;
      an averaging circuit coupled to said scaling input, said video input, and said output for averaging received said video information corresponding to a predetermined area within said screen of said input video device in accordance with a predetermined averaging algorithm and outputting the averaged video information through said output into a predetermined area of said designated window within said screen of said output video device, the ratio of said predetermined area of said screen of said input video device to said predetermined area of said window within said screen of said output video device determined by the scaling information received on said scaling input; and
   an output buffer for receiving and buffering the video output of said scaling device at the input rate and operable to output the buffered video output of said scaling device at an output rate in substantially real time.

12. The pixel processor of claim 11, and further comprising quantizing circuitry for reducing the video information that is output by said video scaling device.

13. The video processor of claim 12, wherein said video input signal presents said screen of said input video device as an array of individual input pixels and said screen of said output video device is represented by an array of output pixels, each of said output pixels represented by a plurality of color planes, each color plane represented by a digital word, said quantizing device operable to quantize each of said digital words in each of said color planes by a predetermined number of digital bits associated with each of said color planes.

14. The video processor of claim 11, wherein said first video format is $C_rC_b$ and said second video format is RGB, said conversion circuitry operable to convert said $C_rC_b$ formatted video to RGB formatted video.

15. The video processor of claim 14, wherein said $C_rC_b$ formatted video is a 444 ratio.

16. The video processor of claim 15, wherein said first video format is at a $C_rC_b$ 422 ratio, said conversion circuitry operable to convert said $C_rC_b$ 422 video format to a $C_rC_b$ 444 video format prior to conversion to RGB video format.

17. The video processor of claim 16, and further comprising bypass circuitry for controlling said conversion circuitry to receive video information in either a YUV 422 video format, a YUV 444 video format or an RGB video format and to selectively convert said YUV 422 video format or said YUV 444 video format to an RGB video format.

18. The video processor of claim 11, and further comprising a control circuit for receiving location parameters for determining the location of said predetermined area of said screen of said input video device that is to be scaled for output to said window within said screen of said output video device.

19. The video processor of claim 11, wherein said screen of said input video device is substantially the same size as said screen of said output video device wherein said output rate is different than the input rate of the video information in said screen of said input video device.

20. The video processor of claim 11, wherein the video information of said screen of said input video device is comprised of an array of pixels of a first predetermined array size and said window within said screen of said output video device is comprised of an array of pixels of a second predetermined array size.

21. The video processor of claim 20, wherein said averaging circuit comprises an interpolation filter for generating the weighted average of at least two pixels disposed proximate to the point in said screen of said input video device that is to be mapped to a point in said screen of said output video device in accordance with the scaling information, the point in said screen of said output video device comprising a pixel in said screen having a value equal to the weighted average value generated by said interpolation filter.

22. The video processor of claim 21, wherein said interpolation filter operates only on pixels in a horizontally adjacent relationship in the rows of said first predetermined array and said averaging circuit further comprises a nearest neighbor circuit for selecting rows of said video information in the rows of pixels in said screen of said input video device that are most proximate to said point in said screen of said input video device that is to be mapped into said point in said screen of said output video device in accordance with a nearest neighbor algorithm.

23. The video processor of claim 11, wherein said output buffer is comprised of a first-in-first-out buffer that is loaded at the input rate and receives an output read clock for reading at an output frame rate different from the input rate.

24. A method for scaling down a video image in a screen of an input video device and mapping the scaled down video image to a designated window within a screen of an output video device, comprising the steps of:

receiving scaling information;
designating a said window within the screen of the output video device;
receiving on a video input, a real time video image from the screen of the input video device;
reducing a size of said received video image as a function of said received scaling information to facilitate said mapping of said received real time video image to the designated window within the screen of the output video device, wherein said reducing step includes the step of:
averaging a portion of the received video image associated with a predetermined area of the screen of the input video device in accordance with a predetermined averaging algorithm and outputting, in substantially real time, the averaged video image into a predetermined area of said window within the screen of the output video device, the ratio of the predetermined area of the screen of the input video device to the predetermined area of said window within the screen of the output video device determined by the scaling information.

25. The method of claim 24, and further comprising the step of receiving location parameters for determining the location of a predetermined area of the screen of the input video device that is scaled for output to said window within the screen of the output video device.

26. The method of claim 24, wherein the screen of the input is substantially the same size as the screen of the output video device and wherein each of the input and output screens are updated in frames, and further comprising, temporarily storing the output averaged video information and outputting the stored averaged video information at a different rate from the rate of the video information in the input video device.

27. The method of claim 24, wherein the video information of the screen of the input video device is comprised of an array of pixels of a first predetermined array size and said window within the screen of the output video device is comprised of an array of pixels of a second predetermined array size.

28. The method of claim 27, wherein the step of averaging comprises processing the video information through an interpolation filter and generating the weighted average of at least two pixels disposed proximate the point in the screen of the input video device that is to be mapped to a point in the screen of the output video device in accordance with the scaling information, the point in the screen of the output video device comprising a pixel in the screen having a value equal to the weighted average value generated by the step of processing through the interpolation filter.

29. The method of claim 28, wherein the step of processing the video information through the interpolation filter operates only on pixels in a horizontally adjacent relationship and the step of averaging further comprises selecting rows of the video information within the rows of pixels in the screen of the input video device in accordance with a nearest neighbor algorithm, such that rows of pixels that are most proximate to the point in the screen of the input video device that is to be mapped into the point in the screen of the output video device are selected.

30. A method for scaling down a video image in a screen of an input video device and mapping the scaled down video image to a window within a screen of an output video device, comprising the steps of:

receiving scaling information;
designating a said window within the screen of the output video device;
receiving on a video input, a real time video image from the screen of the input video device in the form of an array of input pixels;
reducing a size of said received video image as a function of said received scaling information to facilitate said mapping of said received real time video image to said window within the screen of the output video device, wherein said reducing step includes the step of:
processing a portion of the received video image associated with a predetermined area of the screen of the input video device in accordance with a predetermined processing algorithm and outputting, in substantially real time, the processed video image into a predetermined area of said window within the screen of the output video device in the form of an array of output pixels such that ones of the output pixels are functions of at least two of the input pixels, the ratio of the predetermined area of the screen of the input video device to the predetermined area of said window within the screen of the output video device determined by the scaling information;

31. The method of claim 30, and further comprising the step of receiving location parameters for determining the location of a predetermined area of the screen of the input video device that is scaled down for output to said window within the screen of the output video device.

32. The method of claim 30, wherein the step of processing comprises the step of processing the video information through an interpolation filter and generating the weighted average of at least two pixels disposed proximate the point in the screen of the input video device that is to be mapped to a point in the screen of the output video device in accordance with the scaling information, the point in the screen of the output video device comprising one of the output pixels, the output pixel having a value equal to the weighted average value generated by the step of processing the input pixels through the interpolation filter.

33. The method of claim 32, wherein the step of processing the video information through the interpolation filter operates only on input pixels in a horizontally adjacent relationship and the step of processing further comprises selecting rows of the video information within the rows of input pixels in accordance with a nearest neighbor algorithm, such that rows of input pixels that are most proximate to the point in the screen of the input video device that are to be mapped into the point in the screen of the output video device are selected.

34. A method for processing pixels that are disposed in a screen of an input video device in a predetermined array and which are transmitted at an input rate, comprising the steps of:
   receiving on an input, a real time video input signal representing the pixels in the screen of the input video device at the input rate;
   converting the video input signal into a second video format having a higher video bandwidth to provide converted video;
   scaling down the converted video representing the screen of the input video device to a designated window within a screen of an output video device, the step of scaling down including the steps of:
   designating a said window within the screen of the output video device;
   averaging a portion of the converted video that represents a predetermined area of the screen of the input video device in accordance with a predetermined averaging algorithm and outputting the averaged video portion into a predetermined area of the designated window within the screen of the output video device, the ratio of the predetermined area of the screen of the input to the predetermined area of the window within the screen of the output video device determined by the scaling information, and
   outputting the scaled down converted video; and
   buffering the outputted scaled down converted video to temporarily store the scaled down converted video received at the input rate and outputting the temporarily stored scaled down converted video at a second rate in substantially real time.

35. The method of claim 34, further comprising the step of reducing the scaled down converted video prior to the step of buffering.

36. The method of claim 35, wherein each of the pixels in the screen of the output video device is represented by a plurality of color planes, each of the color planes represented by a digital word, wherein the step of reducing the scaled down converted video comprises the step of quantizing each of the digital words associated with each of the color planes by a predetermined number of digital bits.

37. The method of claim 34, wherein the first video format is a YUV format and the second video format is an RGB video format, the step of converting operable to convert the YUV format to the RGB format.

38. The method of claim 37, wherein the YUV format is at a 444 ratio.

39. The method of claim 38, wherein the first video rate is at a YUV 422 video format and, the step of converting operable to convert the YUV 422 video format ratio to a YUV 444 video format prior to conversion to the RGB video format.

40. The method of claim 39, and further comprising the step of bypassing the conversion of the YUV 422 video format to YUV 444 video format to allow reception of YUV 444 video format and bypassing the step of converting from YUV video format to RGB video format to allow reception of RGB formatted video.

41. The method of claim 34, and further comprising the step of receiving location parameters for determining the location of the predetermined area of the screen of the input video device that is to be scaled for output to the screen of the output video device.

42. The method of claim 41, wherein the screen of the input video device is substantially the same size as the screen of the output video device.

43. The method of claim 34, wherein the step of averaging comprises the steps of:
   providing an interpolation filter; and
   processing the converted video through the interpolation filter to generate the weighted average of at least two pixels disposed proximate to the point in the screen of the input video device that is to be mapped to a point in the screen of the output video device in accordance with the scaling information, the point in the screen of the output video device comprising a pixel in the screen having a value equal to the weighted average generated by the step of processing through the interpolation filter.

44. The method of claim 43, wherein the step of processing the converted video through the interpolation filter operates only on pixels in a horizontally adjacent relationship and the step of averaging comprises selecting rows of video information in accordance with a nearest neighbor algorithm, such that rows of pixels in the screen of the input video device that are proximate to the point in the screen of the input video device that is to be mapped into the point in the screen of the output video device are selected for mapping.

45. The method of claim 34, wherein the step of buffering the scaled down converted video comprises the step of processing the scaled down converted video through a first-in-first-out buffer having a write clock operable to write video at the input rate and a read clock received external to the first-in-first-out buffer that allows operation at an output rate.

* * * * *